United States Patent
Faibish et al.

(10) Patent No.: US 10,768,843 B2
(45) Date of Patent: Sep. 8, 2020

(54) OPTMIZING METADATA MANAGEMENT IN DATA DEDUPLICATION

(71) Applicant: EMC IP Holding Company LLC, Hopkinton, MA (US)

(72) Inventors: Sorin Faibish, Newton, MA (US); Philippe Armangau, Acton, MA (US); Istvan Gonczi, Berkley, MA (US); Ivan Bassov, Brookline, MA (US); Anton Kucherov, Dudley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/266,306

(22) Filed: Feb. 4, 2019

(65) Prior Publication Data

US 2020/0249860 A1 Aug. 6, 2020

(51) Int. Cl.
*G06F 3/06* (2006.01)
*G06F 16/215* (2019.01)

(52) U.S. Cl.
CPC .......... *G06F 3/0641* (2013.01); *G06F 3/0608* (2013.01); *G06F 3/0673* (2013.01); *G06F 16/215* (2019.01)

(58) Field of Classification Search
CPC .... G06F 3/0608; G06F 3/0641; G06F 3/0673; G06F 16/215
See application file for complete search history.

(56) References Cited

U.S. PATENT DOCUMENTS

| | | | | |
|---|---|---|---|---|
| 8,392,384 B1 * | 3/2013 | Wu | | G06F 16/1748 707/693 |
| 2005/0216472 A1 * | 9/2005 | Leon | | G06F 16/40 |
| 2010/0082547 A1 * | 4/2010 | Mace | | G06F 11/1435 707/648 |
| 2013/0191349 A1 * | 7/2013 | Akirav | | G06F 17/00 707/692 |

OTHER PUBLICATIONS

Sorin Faibish, "Elastically Managing Cache for Sub-Block Deduplication", U.S. Appl. No. 16/176,703, filed Nov. 15, 2018.
Philippe Armangau, Deduplicating Data at Sub-Block Granularity, U.S. Appl. No. 16/176,729, filed Nov. 15, 2018.

* cited by examiner

*Primary Examiner* — Larry T MacKall
(74) *Attorney, Agent, or Firm* — Muirhead and Saturnelli, LLC

(57) ABSTRACT

Techniques for data processing may include: receiving a candidate block including a plurality of uniformly-sized sub-blocks, wherein a tag is stored at a first location in the candidate block; performing data deduplication processing of the candidate block, wherein the data deduplication processing excludes content stored from a first offset to a second offset corresponding to the first location; determining whether at least one sub-block of the candidate block has been deduplicated by the data deduplication processing; and responsive to determining that at least one sub-block of the candidate block has been deduplicated, storing the candidate block as a deduplicated data block having at least one sub-block matching an existing target sub-block, wherein a tag descriptor describing the tag is stored and associated (Continued)

with the candidate block, such as in block-level metadata of the candidate block. The tag descriptor may include tag content and tag location information.

21 Claims, 17 Drawing Sheets

1500

Candidate Block A 1204

G2

Candidate Block B 1502

G1

G2 Tag Descriptor 1220

1220a Offset=sub-block 4, byte 0 (e.g., byte 2048)
1220b Length=16 bytes (e.g., bytes 0..15)
1220c Tag content=G2

G1 Tag Descriptor 1520

1520a Offset = byte 2
1520b Length=16 bytes (e.g., bytes 2..17)
1520c Tag content=G2

OPTMIZING METADATA MANAGEMENT IN DATA DEDUPLICATION

BACKGROUND

Technical Field

This application generally relates to data storage and, more particularly, data deduplication techniques.

Description of Related Art

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Some storage systems support data "deduplication." A common deduplication scheme involves replacing redundant copies of a data block with pointers to a single retained copy. Data deduplication may operate in the background, after redundant data blocks have been stored, and/or operate inline with storage requests. Inline deduplication matches newly arriving data blocks with previously stored data blocks and configures pointers accordingly, thus avoiding initial storage of redundant copies.

A common deduplication scheme involves computing digests of data blocks and storing the digests in a database. Each digest is computed as a hash of a data block's contents and identifies the data block with a high level of uniqueness, even though the digest is typically much smaller than the data block itself. Digests thus enable block matching to proceed quickly and efficiently, without having to compare blocks directly. For each digest, the database stores a pointer that leads to a stored version of the respective data block. To perform deduplication on a particular candidate block, a storage system computes a digest of the candidate block and searches the database for an entry that matches the computed digest. If a match is found, the storage system arranges metadata of the candidate block to point to the data block that the database has associated with the matching digest. In this manner, a duplicate copy of the data block is avoided.

SUMMARY OF THE INVENTION

In accordance with one aspect of the techniques herein is a method of processing data comprising: receiving a candidate block including a plurality of uniformly-sized sub-blocks, wherein a tag is stored at a first location in the candidate block; performing data deduplication processing of the candidate block, wherein the data deduplication processing excludes content stored from a first offset to a second offset corresponding to the first location; determining whether at least one sub-block of the candidate block has been deduplicated by the data deduplication processing; and responsive to determining that at least one sub-block of the candidate block has been deduplicated, storing the candidate block as a deduplicated data block having at least one sub-block matching an existing target sub-block, wherein a tag descriptor describing the tag is stored and associated with the candidate block. The tag descriptor may be included in block-level metadata of the candidate block. The tag may have a corresponding size that is less than a size of one of the plurality of sub-blocks of the candidate block. The tag may be a logically contiguous region located at the first location in the candidate block. The logically contiguous region may span two logically adjacent sub-blocks of the candidate block. The tag descriptor may include tag content and location information identifying the first location in the candidate block where the tag content is stored at the first location in the candidate block. The location information of the tag descriptor may include a starting offset identifying a starting location in the candidate block where the tag is stored, and a length denoting a length of the tag. The method may include scanning the candidate block from a right-most sub-block and determining the second offset at which a difference is detected between the candidate block and a target block; scanning the candidate block from a left-most sub-block and determining the first offset at which a difference is detected between the candidate block and the target block; determining whether a distance between the first offset and the second offset is less than a maximum tag size; and responsive to determining the distance is less than the maximum tag size, determining that the candidate block has the tag with an associated tag location from the first offset and the second offset in the candidate block. The first processing may determine that the candidate block, excluding content located from the first offset to the second offset, is a duplicate of the target block. The method may include receiving a request to read a first block, wherein at least a first sub-block of the first block has been deduplicated whereby the first sub-block is a duplicate of a first target sub-block, and wherein at least a second sub-block of the first block has not been deduplicated; performing first processing to construct the first data block comprising: storing the first target sub-block and the second sub-block in a buffer; and overwriting specified locations in the buffer with a second tag having an associated second tag descriptor stored in metadata of the first block; and returning the buffer to a client that requested the first block. The first processing may include decompressing the first target sub-block and the second sub-block and storing corresponding decompressed forms of the first target sub-block and the second sub-block in the buffer. The method may be performed inline as part of the I/O or data path, and the candidate block is written in connection with a write I/O operation. The data deduplication processing may include searching a deduplication database for a target sub-block that matches a first sub-block of the candidate block; responsive to finding a matching entry in the deduplication database for the target sub-block matching the first sub-block of the candidate block, performing first processing including: identifying a portion of a previously stored target block that corresponds to the target sub-block; identifying a target range of the target block that matches a duplicate range of the first sub-block of the candidate block; and configuring mapping metadata of the candidate block to reference the target range of the target block as corresponding to deduplicated data stored at the duplicate range of the first sub-block of the candidate block. The deduplication database may be stored in cache as a first deduplication database. The first deduplication database stored in cache may include a portion of entries of a second larger deduplication database that is stored on non-volatile storage. The first deduplication database stored in cache may be indexed using keys of a first size and the second larger deduplication database stored on non-volatile storage may be indexed using keys of a second size larger than the first size. The second larger deduplication database may use keys of the second size generated using a hash function and wherein keys of the first deduplication database may be truncated hash values generated using the hash function. The tag may be a difference or delta region identified in the candidate block that, except for the tag, is identical to an existing target block stored in a deduplication database.

In accordance with another aspect of the techniques herein is a system comprising: at least one processor; and a memory comprising code stored thereon that, when executed, performs a method of processing data comprising: receiving a candidate block including a plurality of uniformly-sized sub-blocks, wherein a tag is stored at a first location in the candidate block; performing data deduplication processing of the candidate block, wherein the data deduplication processing excludes content stored from a first offset to a second offset corresponding to the first location; determining whether at least one sub-block of the candidate block has been deduplicated by the data deduplication processing; and responsive to determining that at least one sub-block of the candidate block has been deduplicated, storing the candidate block as a deduplicated data block having at least one sub-block matching an existing target sub-block, wherein a tag descriptor describing the tag is stored and associated with the candidate block.

In accordance with another aspect of the techniques herein is a computer readable medium comprising code stored thereon that, when executed, performs a method of processing data comprising: receiving a candidate block including a plurality of uniformly-sized sub-blocks, wherein a tag is stored at a first location in the candidate block; performing data deduplication processing of the candidate block, wherein the data deduplication processing excludes content stored from a first offset to a second offset corresponding to the first location; determining whether at least one sub-block of the candidate block has been deduplicated by the data deduplication processing; and responsive to determining that at least one sub-block of the candidate block has been deduplicated, storing the candidate block as a deduplicated data block having at least one sub-block matching an existing target sub-block, wherein a tag descriptor describing the tag is stored and associated with the candidate block. The tag descriptor may be included in block-level metadata of the candidate block.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Unfortunately, conventional deduplication schemes fail to detect redundant data when blocks are similar but not identical. For example, a data storage system might store multiple copies of a given block, which are nearly identical except for a timestamp or label, which is unique to each copy. Owing to the randomizing nature of the hash function, digests computed from the slightly different copies of the data block differ widely from one another, such that deduplication is unable to detect the redundant content. Many opportunities to improve storage efficiency are therefore missed.

In contrast with the prior approach, an improved technique for performing data deduplication operates at sub-block granularity by searching a deduplication database for a match between a candidate sub-block of a candidate block and a target sub-block of a previously-stored target block. When a match is found, the technique identifies a duplicate range shared between the candidate block and the target block and effects persistent storage of the duplicate range by configuring mapping metadata of the candidate block so that it points to the duplicate range in the target block.

Advantageously, improved techniques described herein avoid redundant storage of identical portions of data blocks, even when the data blocks as a whole are different. Storage efficiency is thereby improved.

It should be appreciated that embodiments are provided by way of non-limiting examples to illustrate certain features and principles of the techniques described herein. However, techniques herein are not limited to the particular embodiments described.

Described herein are improved techniques for performing data deduplication that may operate at sub-block granularity by searching a deduplication database for a match between a candidate sub-block of a candidate block and a target sub-block of a previously-stored target block.

When a match is found, the technique identifies a duplicate range shared between the candidate block and the target block and effects persistent storage of the duplicate range by configuring mapping metadata of the candidate block so that it points to the duplicate range in the target block.

Figure 1:
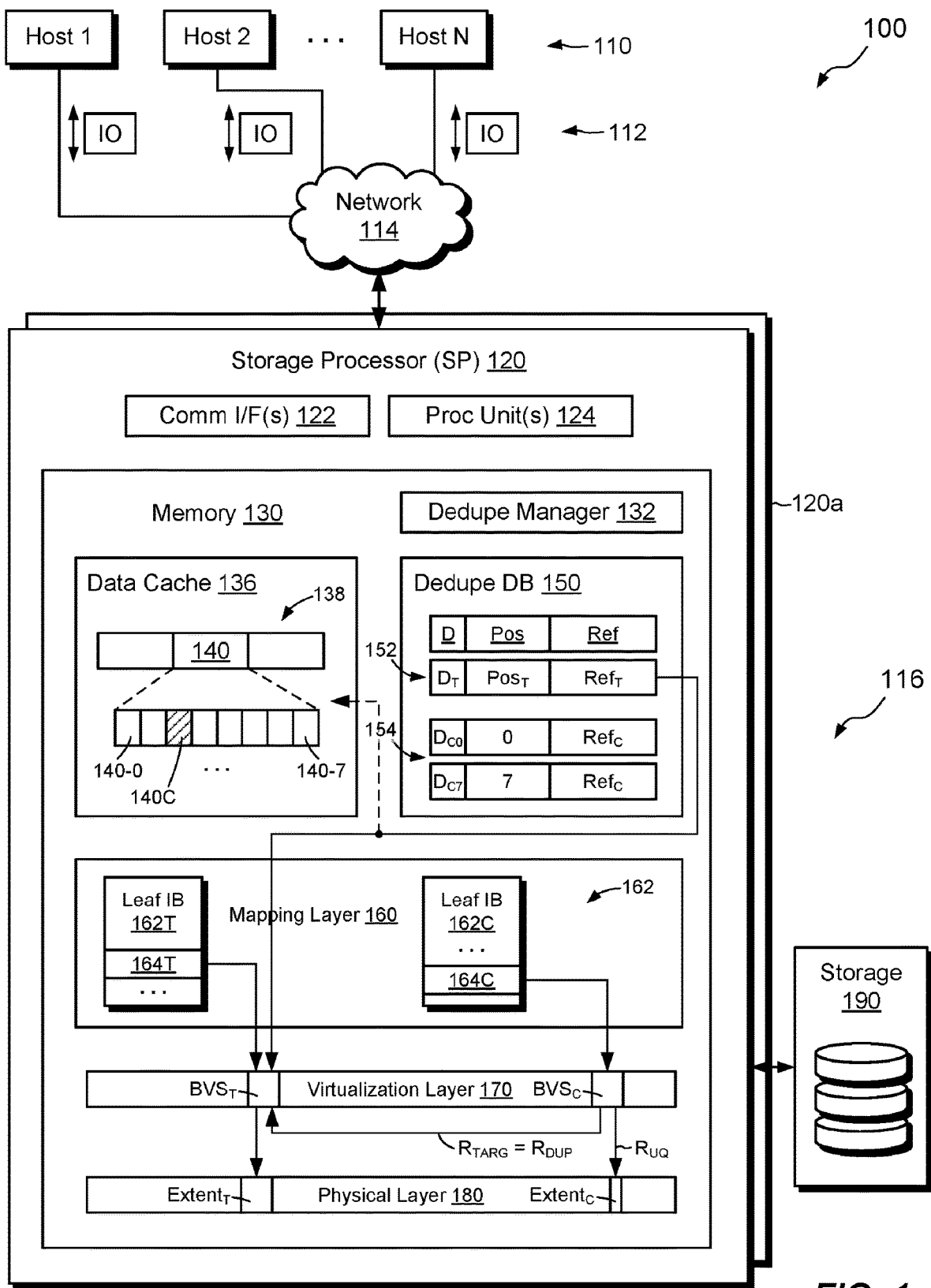
FIG. 1 is a block diagram of an example environment in which embodiments of the improved technique can be practiced.

FIG. 1 shows an example environment 100 in which embodiments of the improved techniques herein can be practiced. Here, multiple hosts 110 access a data storage system 116 over a network 114. The data storage system 116 includes a storage processor, or "SP," 120 and storage 190, such as magnetic disk drives, electronic flash drives, and/or the like. The data storage system 116 may include multiple SPs (e.g., a second SP 120a). For example, multiple SPs may be provided as circuit board assemblies or blades, which plug into a chassis that encloses and cools the SPs. The chassis has a backplane for interconnecting the SPs, and additional connections may be made among SPs using cables. In some examples, the SP 120 is part of a storage cluster, such as one which contains any number of storage appliances, where each appliance includes a pair of SPs connected to shared storage devices. In some arrangements, a host application runs directly on the SP (or SPs), such that separate host machines 110 need not be present. No particular hardware configuration is required, however, as any number of SPs may be provided, including a single SP, in any arrangement, and the SP 120 can be any type of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the SP 120 using various technologies, such as Fibre Channel, iSCSI (Internet small computer system interface), NFS (network file system), and CIFS (common Internet file system), for example. As is known, Fibre Channel and iSCSI are block-based protocols, whereas NFS and CIFS are file-based protocols. The SP 120 is configured to receive I/O requests 112 according to block-based and/or file-based protocols and to respond to such I/O requests 112 by reading or writing the storage 190.

The SP 120 includes one or more communication interfaces 122, a set of processing units 124, and memory 130. The communication interfaces 122 include, for example, SCSI target adapters and/or network interface adapters for converting electronic and/or optical signals received over the network 114 to electronic form for use by the SP 120. The set of processing units 124 includes one or more processing chips and/or assemblies, such as numerous multi-core CPUs. The memory 130 includes both volatile memory, e.g., Random Access Memory (RAM), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a data cache 136, a deduplication ("dedupe") manager 132, a deduplication database 150, a mapping layer 160, a virtualization layer 170, and a physical layer 180. The dedupe manager 132 is configured to manage deduplication activities. The data cache 136 may be realized in volatile memory (e.g., RAM) and is configured to store temporarily incoming data arriving from hosts 110. The data cache 136 may also store recently-written and/or read data blocks, to support deduplication. In an example, the data cache 136 defines incoming data 138 from hosts 110 in the form of blocks (such as block 140), where each block is composed of a sequence of sub-blocks (e.g., sub-blocks 140-0 through 140-7). As is known, a "block" is a unit of storage in a data storage system, which generally corresponds to the smallest unit of storage space that can be allocated. Block sizes vary from one storage system to the next, with typical sizes being 4 kB (kilobytes) or 8 kB, for example. In the particular arrangement shown, there are eight sub-blocks per block, and the sub-blocks are contiguous and uniform in size. For example, if the block size is 4 kB, each sub-block would be 512 B, which corresponds to one sector.

The dedupe database 150 is configured to store digests of sub-blocks along with associated information. For example, the dedupe database 150 stores, for each of multiple sub-blocks, a digest "D" of that sub-block and a reference ("Ref") to a location, in the data storage system 116, of a data block that contained the respective sub-block when the database entry was made. The SP 120 computes each digest as a hash of the respective sub-block's contents. Thus, different sub-blocks produce different digests, with rare hash collisions being possible. The reference Ref may take various forms. For example, Ref may point to a memory location in the data cache 136 where the data block is temporarily being held. Alternatively, Ref may point to metadata (e.g., a block virtualization structure) that maps to the data block, such that a persisted version of the data block may be obtained by following the reference to the pointed-to metadata. In some examples, the reference points directly to the data block, e.g., in the physical layer 180. An entry in the dedupe database 150 may further include a sub-block position, "Pos," which indicates a position of the sub-block for that entry in the referenced data block. For example, if the sub-block for a database entry was the first sub-block in the data block that contained it, then the position Pos might be 0. If the sub-block was the last sub-block in the data block, then the position Pos might be 7. In some examples, entries in the dedupe database 150 are created only for first and last sub-blocks of their parent data blocks, such that there are only two possibilities and Pos may be represented with a single bit. In some examples, sub-block position may be tracked using a separate bitmap. The bitmap may be arranged by sub-block and may provide a single bit for each sub-block, to indicate whether the respective sub-block is in the first position or in the last position.

The dedupe database 150 may operate as a memory-resident cache. The cache may utilize an LRU (least-recently used) eviction policy. In some examples, when evicting an entry from the dedupe database 150, the SP 120 also evicts the data block referenced by that entry in the data cache 136.

In some cases, the dedupe database 150 is backed by persistent storage, with portions read into volatile memory as needed for fast access.

The mapping layer 160 includes metadata for mapping blocks of data objects, such as LUNs (Logical UNits), file systems, virtual machine disks, and/or the like, which may be managed by a separate namespace layer (not shown). The mapping layer 160 maps each data object to a corresponding set of block virtualization structures ("BVSs") in the virtualization layer 170. In some examples, one BVS is provided for each addressable data block in the storage system. The mapping layer 160 includes indirect blocks ("IBs") 162. Each IB 162 is a block that contains an array of block pointers, such as 1024 block pointers. In an example, IBs 162 are arranged in a tree, or in multiple trees, in which block pointers in parent IBs point to child IBs and thus multiply the total number of BVSs (and therefore data blocks) that can be addressed.

In the virtualization layer 170, the BVSs enable the data storage system 116 to deduplicate physical data blocks and to relocate physical data blocks without having to update block pointers in the mapping layer 160. Block pointer updates would be a very burdensome task, given that block pointers tend to be much more numerous and widely dispersed than are BVSs.

The physical layer 180 manages the physical data blocks of the data storage system 116. For example, the physical layer 180 is denominated in data blocks of uniform size, such as 4 kB, 8 kB, or the like. Each data block is uniquely addressable.

The physical layer 180 is configured to store host data as storage extents in the data blocks. The extents may hold compressed data or uncompressed data. Some extents may be smaller than a block, e.g., if the data are compressed and/or if only a portion of a block's data are uniquely stored. One should appreciate that the physical layer 180 is itself a logical structure and that the bits of data are actually stored in devices of the storage 190. The data storage system 116 may include additional layers, which are not shown, such as a RAID (Redundant Array of Independent (or Inexpensive) Disks) layer, additional mapping layers, and the like. The depicted arrangement is intended merely to be illustrative.

In example operation, the hosts 110 issue I/O requests 112 to the data storage system 116. The SP 120 receives the I/O requests 112 at the communication interfaces 122 and initiates further processing. For example, the SP 120 receives sets of incoming data 138 being written by hosts 110 and renders the data in block-sized increments of memory, referred to herein simply as "blocks." The data as received from the hosts is not necessarily block-denominated and may arrive in I/O's of any size. Nevertheless, the data cache 136 may store the arriving data as blocks, which the data cache 136 may realize in buffer caches, for example. The size of the buffer caches is preferably configured to match the block size of the data storage system 116.

To support sub-block data deduplication, the SP 120 defines multiple sub-blocks for the defined blocks. For example, the SP 120 renders block 140 as sub-blocks 140-0 through 140-7, which are contiguous and uniformly sized. The inventors have recognized that a sub-block size of 512 B (one sector) is particularly well-suited for sub-block deduplication, as many host applications use the sector as a standard size for performing writes. Although host applications may shift data when writing to the data storage system 116, such shifts tend to appear in full-sector increments. Performing deduplication at per-sector granularity thus catches many shifted sectors that conventional, block-based deduplication would miss. Setting the sub-block size to something different from a sector is not excluded from processing described herein.

With the sub-blocks 140-0 through 140-7 defined, a deduplication attempt begins by attempting to match one or more the sub-blocks to an entry in the dedupe database 150. For example, the dedupe manager 132 receives a candidate sub-block 140C of the candidate block 140 and generates a digest of the candidate sub-block 140C, e.g., by applying a hash function to the contents of sub-block 140C. The dedupe manager 132 then searches the dedupe database 150 for a digest D that matches the computed digest of sub-block 140C. In a non-limiting example, the dedupe database 150 is constructed as a key-value store, where the digest D forms the key and the reference Ref and position Pos form the value. In such cases, searching for a matching entry in the dedupe database 150 merely entails looking up the value that corresponds to the digest which is applied as the key. If no match is found, the dedupe manager 132 may try a different sub-block of candidate block 140. If no match is found after attempting all sub-blocks 140-0 through 140-7, then the deduplication attempt fails for the candidate block 140. The SP 120 may then allocate a new storage extent from the physical layer 180 and store the contents of the candidate block 140 in the newly allocated extent.

If the dedupe manager 132 succeeds, however, in finding a matching entry 152 to the candidate sub-block 140C, then deduplication proceeds. In an example, the matching entry 152 is the entry in the dedupe database 150 for which the digest $D_T$ matches the computed digest of the candidate sub-block 140C. The digest $D_T$ itself was computed for an earlier processed sub-block, which we refer to as a "target sub-block," and was part of an earlier-processed data block, which we refer to as a "target block."

The dedupe manager 132 then follows the reference $Ref_T$ in the matching entry to obtain the target block, which may still reside in the data cache 136 or which may be fetched from storage 190 if it does not. Depending on implementation, the deduplication attempt may fail if there is a cache miss, as fetching the target block from disk may be too time-consuming to be warranted.

Assuming the target block is obtained, the dedupe manager 132 may proceed by confirming the match. For example, the dedupe manager 132 compares the candidate sub-block 140C with the target sub-block as read from the target block and tests whether the two are the same, e.g., by performing a data comparison. Note that the matching entry 152 indicates, via $Pos_T$, the position of the target sub-block in the target block. Thus, the comparison may proceed without having to scan the entire target block.

Assuming the match is confirmed, the dedupe manager 132 may identify the full extent of the match. For example, a match to the target sub-block may be part of a larger match between the candidate block 140 and the target block. Given the position, $Pos_T$, of the target sub-block in the target block, the dedupe manager 132 selects a direction in which to search for an extended match. For instance, if the target sub-block was the first block in the target block, then the search should proceed in the forward direction. But if the target sub-block was the last block in the target block, the search should proceed in the reverse direction. The dedupe manager 132 proceeds in the indicated direction, comparing bytes of the candidate block 140 with corresponding bytes of the target block, until an end of the candidate block 140 is reached or until the bytes of the two blocks no longer match. The dedupe manager 132 then identifies a boundary between a duplicate range of the candidate block, $R_{DUP}$, which is shared with a target range $R_{TARG}$ of the target block, and a unique range of the candidate block $R_{UQ}$, which is unique to the candidate block 140. Some block comparisons may yield two unique ranges, one before the duplicate range $R_{DUP}$ and one after.

Next, the dedupe manager 132 effects persistent storage of the candidate block 140, in a manner that efficiently accounts for both the duplicate range $R_{DUP}$ and the unique range $R_{UQ}$ (or unique ranges). In the example shown, the data storage system 116 has already stored the target block, along with metadata to support it. For example, SP 120 already configured a block pointer 164T in a leaf IB 162T in the mapping layer 160. The block pointer 164T is already configured to point to $BVS_T$ in the virtualization layer 170. $BVS_T$ in turn points to $Extent_T$, which stores the target block in the physical layer 180. Now, to support storage of the candidate block 140, the mapping layer 160 configures a block pointer 164C in leaf IB 162C. The block pointer 164C points to BVSc, which is made to point to two different locations. The first location is the address of $Extent_C$, which is designated for storing the unique range (or ranges), $R_{UQ}$, of the candidate block. The second location is the address of $BVS_T$, i.e., the BVS that points to the target block and contains the duplicate range, $R_{DUP}$. When pointing to $BVS_T$, the metadata in BVSc may specify the range $R_{TARG}$ of the target block that contains the shared data, such as by offset and length. The SP 120 may then store the unique range $R_{UQ}$ in $Extent_C$. The stored data may be compressed, if desired.

The described operations thus effect storage of the candidate block 140 while consuming only the amount of storage space required to support the unique range, $R_{UQ}$, which may be as small as a single sector, or smaller if compressed. Some additional metadata may be needed, but the additional metadata is small compared with the amount of storage space conserved. In a conventional, block-based deduplication scheme, the unique range $R_{UQ}$ would have precluded any match to a previous block, so the entire block would have to have been stored, which would have been up to eight times the amount of data that is stored in the current example.

One significant feature of the described technique is that it combines digest-based lookups of sub-blocks with data comparisons of data. In some circumstances, this arrangement allows data to be deduplicated at levels even smaller than the size of a sub-block. For example, when comparing the candidate block 140 with the target block, the dedupe manager 132 may operate with arbitrarily high precision. Thus, the dedupe manager 132 can identify boundaries between duplicate ranges and unique ranges with precision as high as a single byte.

Because the described technique uses data comparisons as part of its processing, the act of confirming that there are no hash collisions is a simple matter, as the target block and candidate block are already being compared. Some embodiments leverage this feature by using relatively small digests in the dedupe database 150, such as digests having fewer than 128 bits. Although long digests can reduce the risk of hash collisions to nearly zero, they are complex to compute and can place high burdens on processor cores. As the disclosed technique compares the blocks as part of its regular processing, the technique is tolerant to hash collisions. Should a hash collision (false positive match) occur, the collision will be detected by data comparison and treated as a non-match. In such cases, the dedupe manager 132 can simply try again or move on to the next sub-block of the candidate block, attempting to match that one.

Also, one of ordinary skill in the art will appreciate that sub-block deduplication is also capable of matching entire blocks. For instance, if a data comparison of a candidate block to a target block results in a duplicate range $R_{DUP}$ the size of the entire block, with a unique range $R_{UQ}$ of zero size, then the entire block is matched and no unique range needs to be stored.

One might observe that sub-block duplication generally requires a greater number of digest lookups than does block-based deduplication. However, the use of smaller digests can help to offset the increased number of lookups. Also, implementations may limit the cost of lookups where no match is found by using Bloom filters, for example.

Although data comparisons are the general rule, it can be avoided in some circumstances. For instance, if the candidate sub-block is in the first position of the candidate block (like sub-block 140-0), and the position indicator $Pos_T$ of the matching entry 152 indicates the last position in the target block, then the match cannot be extended as there is no possibility of there being additional shared content. The match would thus be limited to the matching sub-block, and a data comparison is avoided.

The dedupe manager 132 may also play a role in loading the dedupe database 150 with new content. For instance, as the data cache 136 receives new host data and defines new blocks, the dedupe manager 132 may access those blocks and create new database entries for one or more of their sub-blocks. Creating new entries for all sub-blocks of each newly defined block is certainly an option, but we have recognized that it is generally sufficient to create entries for only the first and the last sub-blocks, e.g., 140-0 and 140-7. In the example shown, the dedupe manager 132 has created new database entries for sub-blocks 140-0 and 140-7. Each entry includes a digest hash of the respective sub-block ($D_{C0}$ or $D_{C7}$), a position (0 or 7) of the respective sub-block in the candidate block 140, and a reference Refc to the candidate block 140, which may be a pointer to the buffer cache that stores the candidate block 140 in the data cache 136.

A rationale behind limiting new database entries to first and last sub-blocks is that data shifts (by sector increments) may be common, but data inserts may be expected to be relatively rare. Recording entries for the first and last sub-blocks ensures that shifted data will produce at least one sub-block match. In some cases, new sub-block entries are avoided for sub-blocks that are already recorded in entries of the dedupe database 150.

Figure 2A:
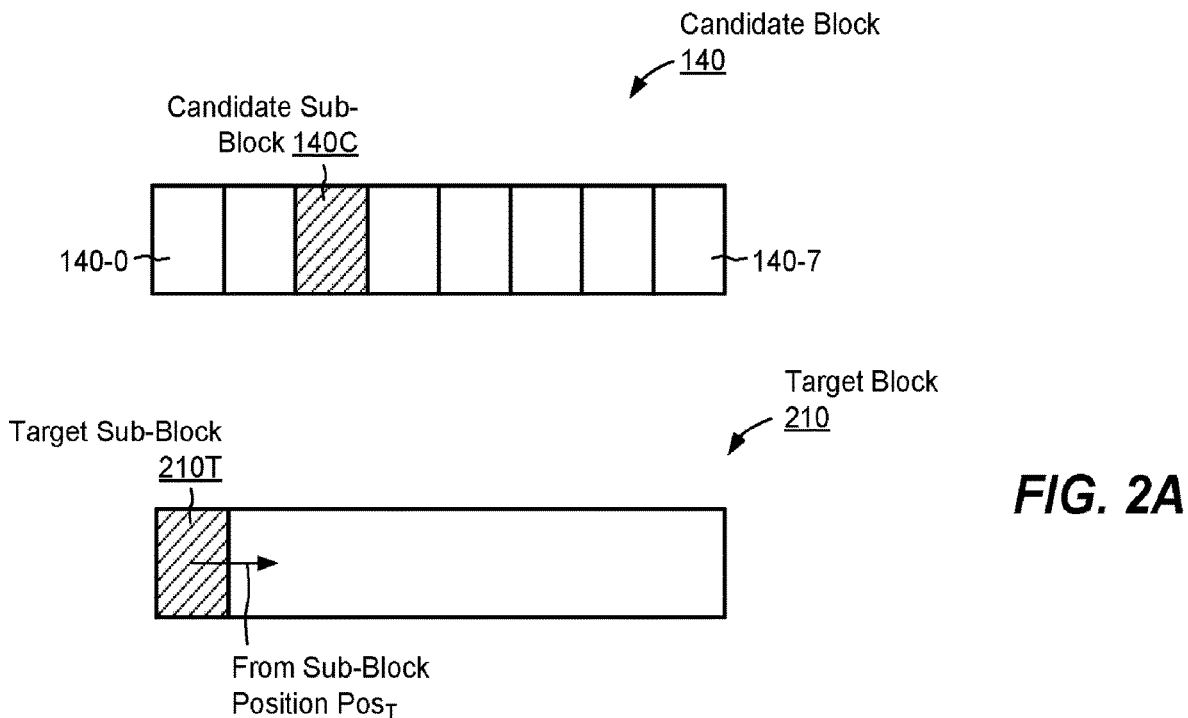
FIGS. 2A and 2B are diagrams that show an example sequence for identifying a duplicate range and a unique range of a candidate block when a candidate sub-block has matched to a target sub-block that occupies a first position of a target block.
Figure 2B:
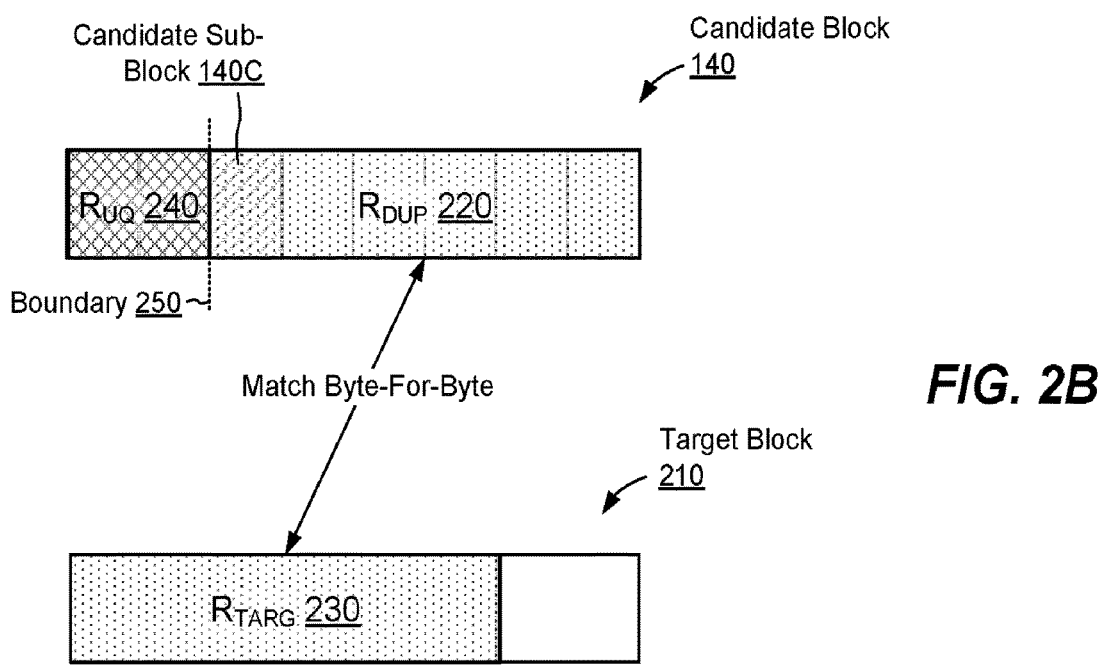

Referring to FIGS. 2A and 2B, shown is an example sequence for deduplicating a portion of candidate block 140 when candidate sub-block 140C has been matched to a target sub-block 210T in a first position of a target block 210. As shown in FIG. 2A, the value of $Pos_T$ in the matching entry 152 has identified the target sub-block 210T as being in the first position of the target block 210, which indicates a forward search direction through the candidate block 140. The dedupe manager 132 proceeds to search in the forward direction through the candidate block, starting with the candidate sub-block 140C (or the forward end of it, e.g., if a hash collision has been ruled out). As the dedupe manager 132 advances through the candidate block 140, it advances correspondingly through the target block 210, comparing data of the candidate block 140 with data of the target block 210 at a level of granularity smaller than the size of a sub-block. For instance, comparisons may proceed in 16-byte chunks, in 8-byte chunks, in 1-byte chunks, or in any-sized chunks are best suited to the implementation.

At some point, the dedupe manager 132 either detects a mismatch or reaches the forward end of the candidate block 140. In this example, no mismatch is detected and, as shown in FIG. 2B, the dedupe manager 132 identifies a duplicate range $R_{DUP}$ 220 in the candidate block 140 and a corresponding target range $R_{TARG}$ 230 in the target block 210. These ranges match byte-for-byte and are exact duplicates of each other. The dedupe manager 132 also identifies a unique range, $R_{UQ}$ 240, of the candidate block, which does not correspond to any content in the target block 210. A boundary 250 may be identified between the duplicate range $R_{DUP}$ 220 and the unique range $R_{UQ}$ 240. In this case, the boundary 250 aligns with a sub-block boundary, i.e., between sub-blocks 140-1 and 140-2. The dedupe manager 132 then proceeds as already described, by arranging mapping metadata to effect storage of the duplicate range $R_{DUP}$ (by reference to the range $R_{TARG}$ in the target block) and by directing storage of the unique range $R_{UQ}$ in a storage extent in the physical layer 180. This example thus avoids redundant storage of $R_{DUP}$ and saves three quarters of a block.

Figure 3A:
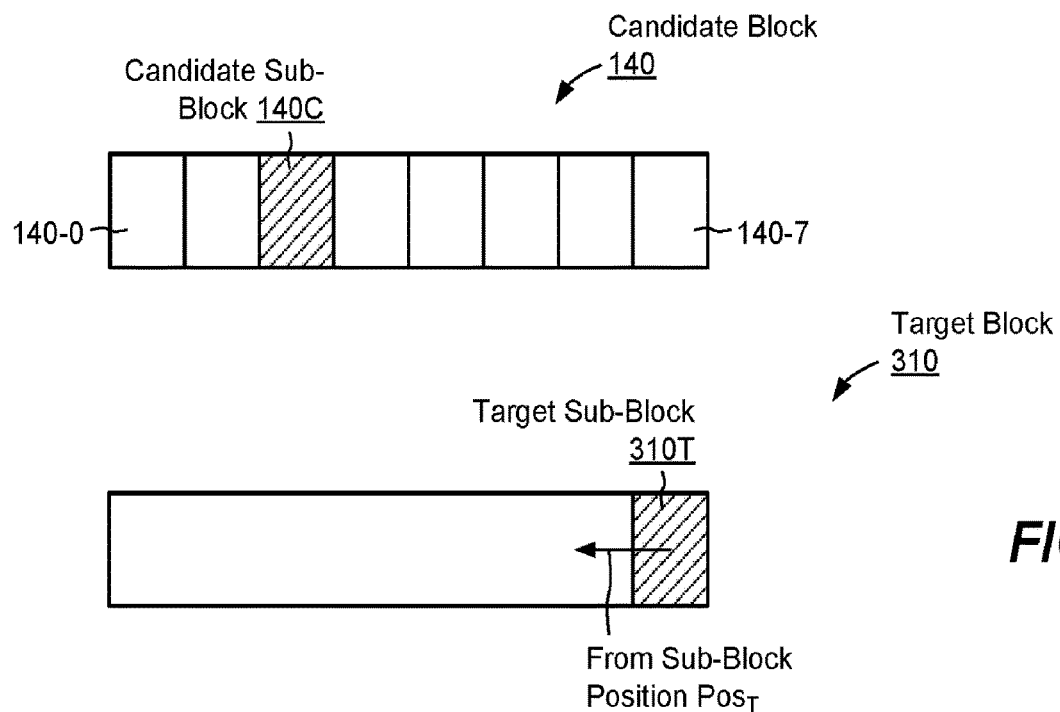
FIGS. 3A and 3B are diagrams that show an example sequence for identifying a duplicate range and a unique range of a candidate block when a candidate sub-block has matched to a target sub-block that occupies a last position of a target block.
Figure 3B:
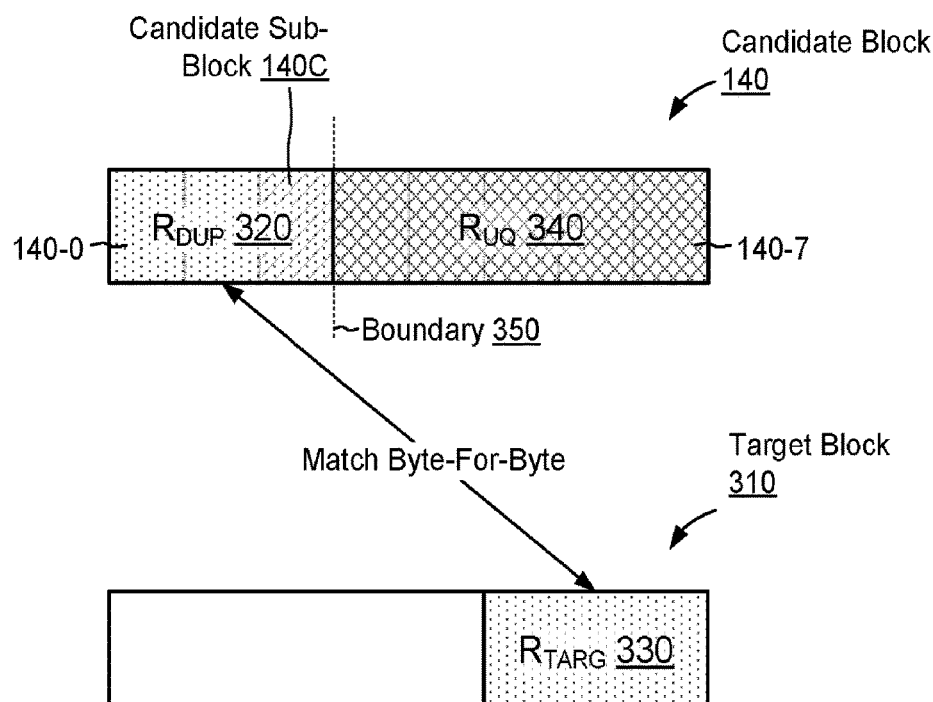

Referring to FIGS. 3A and 3B, shown is an example sequence for deduplicating a portion of candidate block 140 when candidate sub-block 140C has been matched to a target sub-block 310T in a last position of a target block 310. As shown in FIG. 3A, the value of $Pos_T$ in the matching entry 152 has identified the target sub-block 310T as being in the last position of the target block 310, which indicates a reverse search direction through the candidate block 140. The dedupe manager 132 proceeds to search in the reverse direction through the candidate block, starting with the candidate sub-block 140C (or the back end of it). As the dedupe manager 132 retracts through the candidate block 140, it retracts correspondingly through the target block 310, comparing data of the candidate block 140 with data of the target block 310 at fine granularity. In this example, no mismatch is detected and, as shown in FIG. 3B, the dedupe manager 132 identifies a duplicate range $R_{DUP}$ 320 in the candidate block 140 and a corresponding target range $R_{TARG}$ 330 in the target block 310. The dedupe manager 132 also identifies a unique range, $R_{UQ}$ 340, of the candidate block 140, which does not correspond to any content in the target block 310. A boundary 350 may also be identified between the duplicate range $R_{DUP}$ 320 and the unique range $R_{UQ}$ 340. In this case, the boundary 350 aligns with a sub-block boundary, i.e., between sub-blocks 140-2 and 140-3. The process then proceeds as described above, by arranging mapping metadata to effect storage of the duplicate range $R_{DUP}$ and by directing storage of the unique range $R_{UQ}$ in the physical layer 180. This example saves three eighths of a block.

Figure 4A:
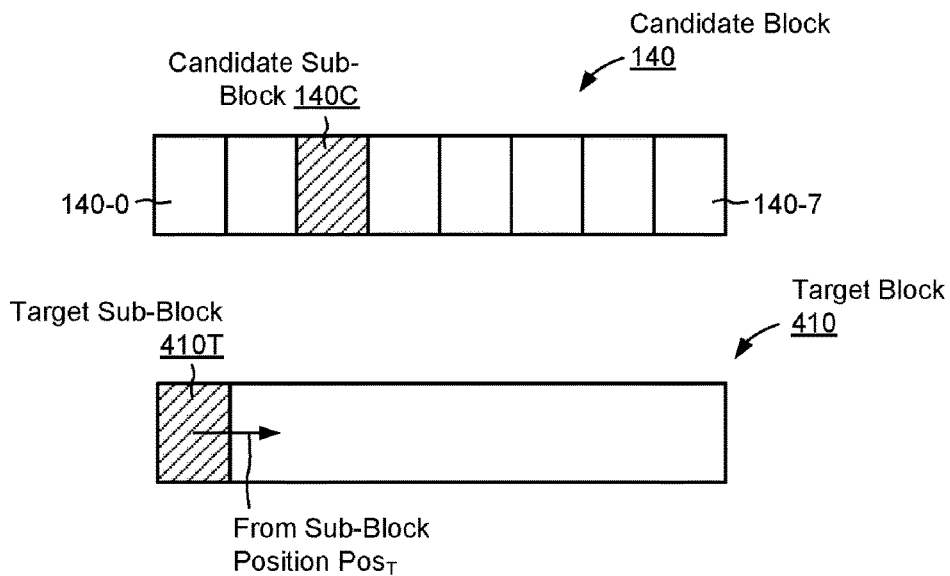
FIGS. 4A, 4B and 4C are diagrams that show an example sequence for identifying a duplicate range and two discontiguous unique ranges of a candidate block when the duplicate range does not extend all the way to an end of the candidate block.
Figure 4B:
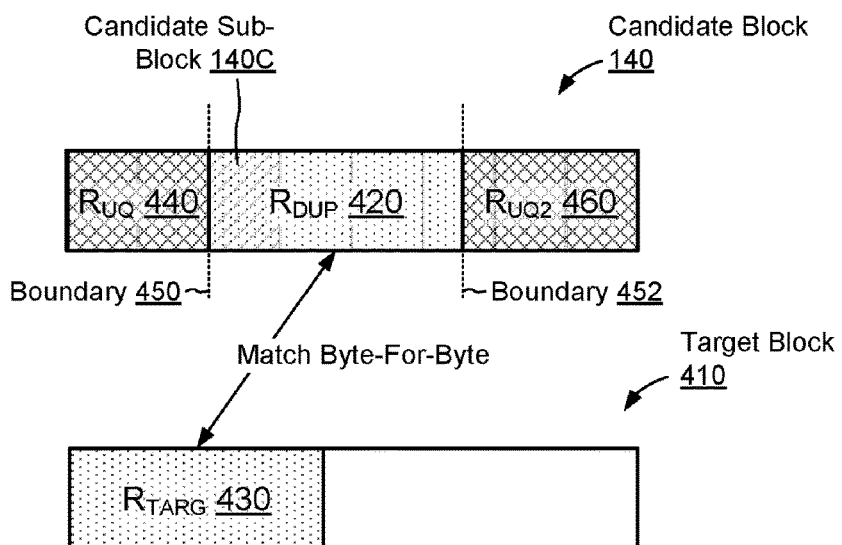

Referring to FIGS. 4A and 4B, shown is a slightly more complex example. As in FIG. 2A, the candidate sub-block 140C has been matched to a target sub-block 410T in a first position of a target block 410. But here, the comparison between candidate block 140 and target block 410 has yielded a mismatch. Rather than extending all the way to the end of the candidate block 140, as in FIG. 2B, the duplicate range $R_{DUP}$ 420 ends at boundary 452. Beyond this point, the contents of the two blocks diverge. The boundary 452 does not align with any boundary between sub-blocks but can rather be found at some byte location relative to the fifth sub-block, 140-5.

As shown in FIG. 4B, three distinct ranges are formed: a duplicate range $R_{DUP}$ 420; a first unique range $R_{UQ}$ 440; and a second unique range $R_{UQ2}$ 460. Boundary 450 separates $R_{DUP}$ from $R_{UQ}$, and boundary 452 separates $R_{DUP}$ from $R_{UQ2}$. Range $R_{DUP}$ 420 matches target range $R_{TARG}$ 430 byte-for-byte.

Figure 4C:
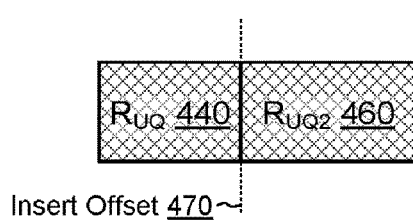

As shown in FIG. 4C dedupe manager 132 may combine the two unique ranges, $R_{uQ}$ 440 and $R_{uQ2}$ 460, by placing them adjacently, while specifying an insert offset 470 to identify their boundary. The insert offset range 470 is so named as it identifies the location at which the contents of $R_{DUP}$ 420 is to be inserted when the candidate block 140 is reconstructed, e.g., when a later read request arrives. In an example, the SP 120 stores the insert offset 470 in mapping metadata for the candidate block 140. Although not addressed previously, the examples in FIGS. 2A/2B and 3A/3B may also involve specifying an insert offset, which in those examples would indicate whether the duplicate range $R_{DUP}$ is to be inserted before or after the unique range, $R_{UQ}$, when reconstructing the respective candidate blocks.

Figure 5A:
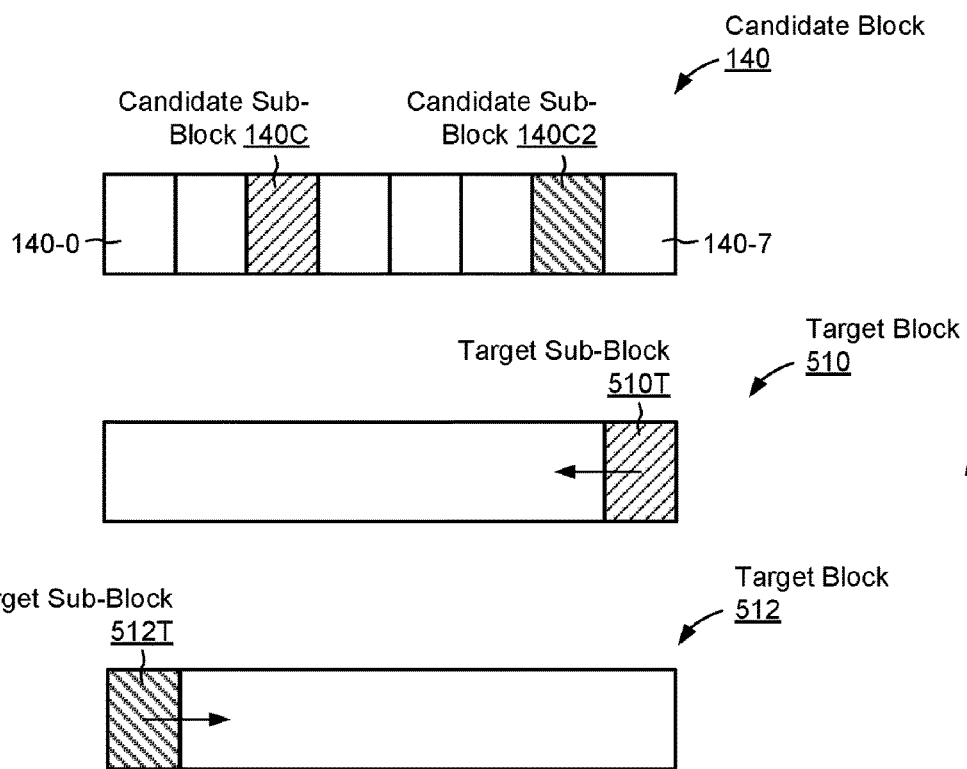
FIGS. 5A and 5B are diagrams that show an example sequence for identifying two duplicate ranges and a unique range of a candidate block when two candidate sub-blocks have matched to two different target blocks.
Figure 5B:
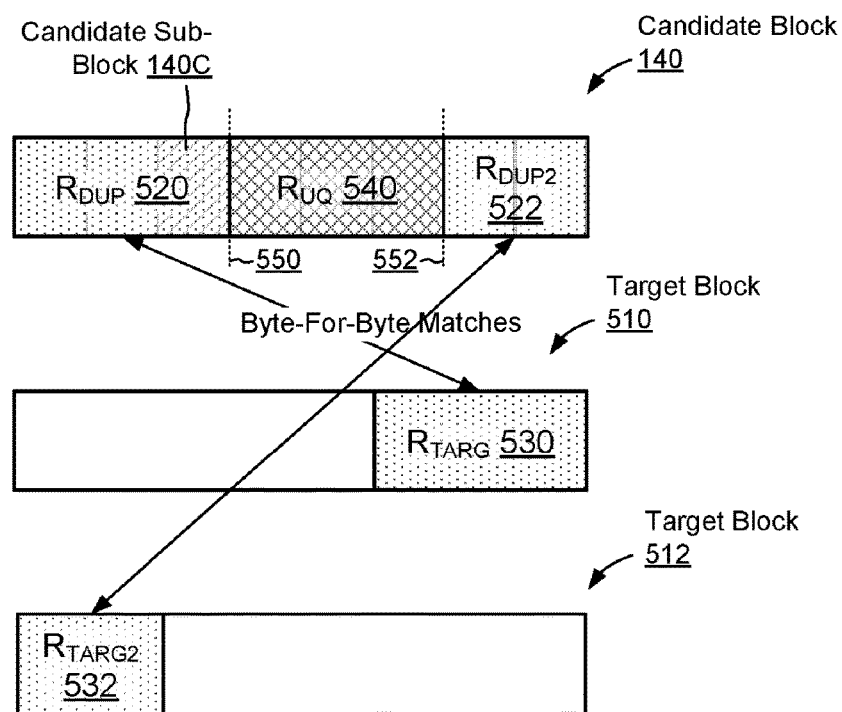

Referring to FIGS. 5A and 5B, shown is a slightly more complex example still. As shown in FIG. 5A, two candidate sub-blocks, 140C and 140C2, of the candidate block 140 have produced respective matches to two different entries in the digest database 150. In this example, the different matches reference different target blocks 510 and 512. In particular, candidate sub-block 140C has matched target sub-block 510T, which occupies the last position in target block 510, and candidate sub-block 140C2 has matched target sub-block 512T, which occupies the first position of target block 512. As shown in FIG. 5B, the dedupe manager 132 has identified two duplicate ranges, $R_{DUP}$ 520 and $R_{DUP2}$ 522, with a single unique range $R_{UQ}$ 540 separating the two duplicate ranges. Duplicate range $R_{DUP}$ 520 matches, byte-for-byte, target range $R_{TARG}$ 530 in target block 510, and duplicate range $R_{DUP2}$ 522 matches, byte-for-byte, target range $R_{TARG}$ 532 in target block 512. Boundaries 550 and 552 separate the ranges of the candidate block 140 in the manner shown. As usual, the process stores the unique range $R_{UQ}$ 540 in a storage extent in the physical layer 180.

The presence of two duplicate ranges may necessitate the creation of additional metadata, as BVSc of the candidate block 140 must point to two different target ranges 530 and 532 in two different target blocks 510 and 512. Two insert offsets may be specified, as well, to indicate where each duplicate range is to be inserted relative to the unique range.

Figure 6A:
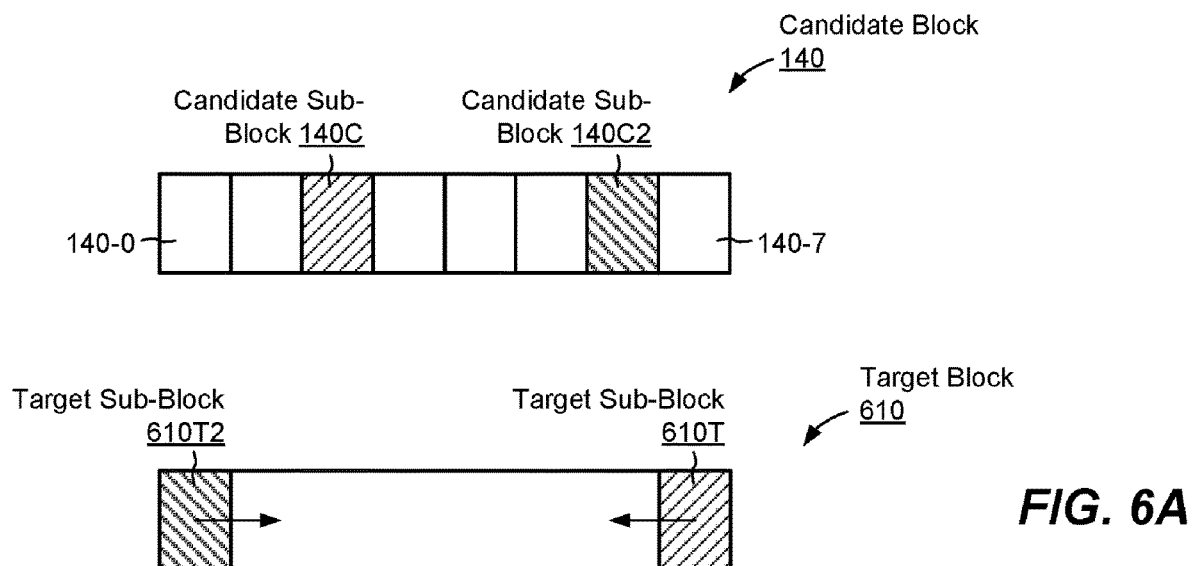
FIGS. 6A and 6B are diagrams that show an example sequence for identifying two duplicate ranges and a unique range of a candidate block when two candidate sub-blocks have matched to two distinct ranges of a single target block.
Figure 6B:
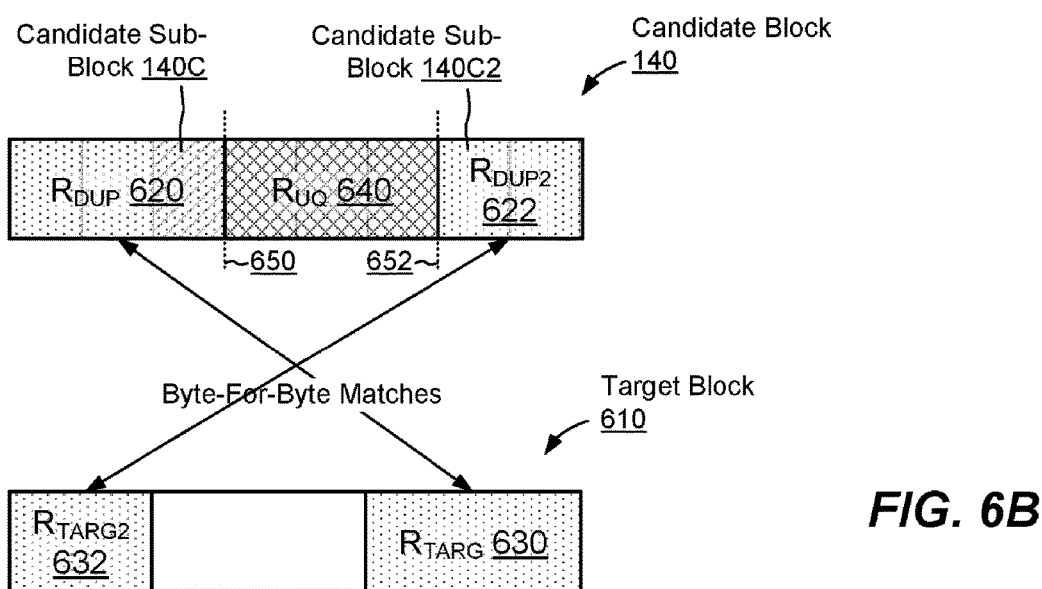

Referring to FIGS. 6A and 6B, shown is yet another example. This example is similar to the one shown in FIGS. 5A and 5B, but here two target sub-blocks 610T and 610T2 are found within the same target block 610, rather than in two different target blocks. Candidate sub-block 140C has matched to target sub-block 610T, and candidate sub-block 140C2 has matched to target sub-block 610T2. As shown in FIG. 6B, two duplicate ranges are formed, $R_{DUP}$ 620 and $R_{DUP2}$ 622, which match, respectively, with target ranges $R_{TARG}$ 630 and $R_{TARG2}$ 632. A single unique range $R_{UQ}$ 640 is formed in the candidate block 140 between the two duplicate ranges, with boundaries 650 and 652 identified as shown. Unique range $R_{UQ}$ 640 may be stored in the usual way. BVSc of the candidate block 140 must now point to two different target ranges 630 and 632 in the target block 610, which may require two different insert offsets.

Figure 7:
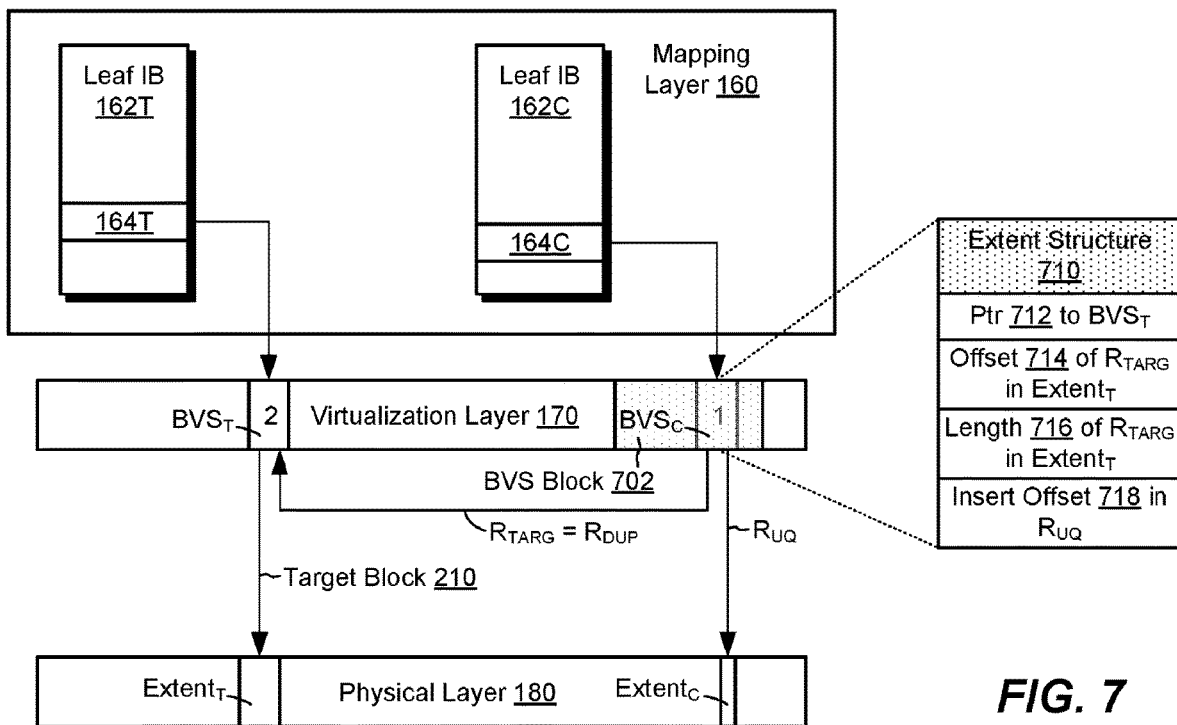
FIG. 7 is a block diagram of an example arrangement where mapping metadata is provided in a virtualization layer for supporting deduplication at sub-block granularity.

FIG. 7 shows the example metadata structures of FIG. 1 in additional detail. Here, it is seen that BVSc, which is provided for mapping the candidate block 140, is located within a BVS block 702. In some examples, BVS block 702 may include a large number of BVSs. Each BVS has a reference count, which tracks the number of block pointers that point to the respective BVS. For instance, BVSc has a reference count of one, because only one block pointer, pointer 164C in leaf IB 162C, points to it. BVST, which is provided for mapping the target block 210, has a reference count of two, reflecting the fact that both block pointer 164T in leaf IB 162T and a pointer in BVSc point to it.

As shown to the right of FIG. 7, BVSc stores an extent structure 710. The extent structure 710 is metadata that references a range of data in the current block within the data of another block. For example, BVSc supports mapping for a particular logical address of a particular data object hosted by the data storage system 116, and BVSc resolves that logical address into a first pointer to the unique range $R_{UQ}$ and a second pointer to the duplicate range $R_{DUP}$. Here, the first pointer of BVSc points to $Extent_C$ and the second pointer, which is provided within the extent structure 710, points to the target range $R_{TARG}$ of the target block 210. Example metadata elements of the extent structure 710 include the following:

Pointer 712. An address of BVST, the BVS of the target block where the duplicate range resides in the virtualization layer 170.
  Offset 714. Offset of the target range $R_{TARG}$ in $Extent_T$. Used for locating the starting location of $R_{TARG}$, which matches $R_{DUP}$.
  Length 716. The length of the target range $R_{TARG}$ in $Extent_T$. The offset 714 and length 716 together fully identify the target range $R_{TARG}$ within $Extent_T$, which is itself fully identified by the pointer 712.
  Insert Offset 718. An offset relative to the unique range $R_{UQ}$ in $Extent_C$ where the contents of the duplicate range $R_{DUP}$ are to be inserted when reconstituting the candidate block 140.

One should appreciate that an extent structure 710 is required only in cases where some of the contents that would normally be contained in an extent pointed to by a BVS have been deduplicated, such that those contents reside in a different physical extent from the one pointed to by that BVS. Thus, only some BVSs will use extent structures 710, whereas others do not. In addition, some BVSs may employ multiple extent structures 710. The examples presented in FIGS. 5A/5B and 6A/6B would each require two extent structures 710, one for identifying each of the two duplicate ranges presented in each example. Further, one should appreciate that the placement of extent structures 710 in the mapping metadata may be varied.

Figure 8:
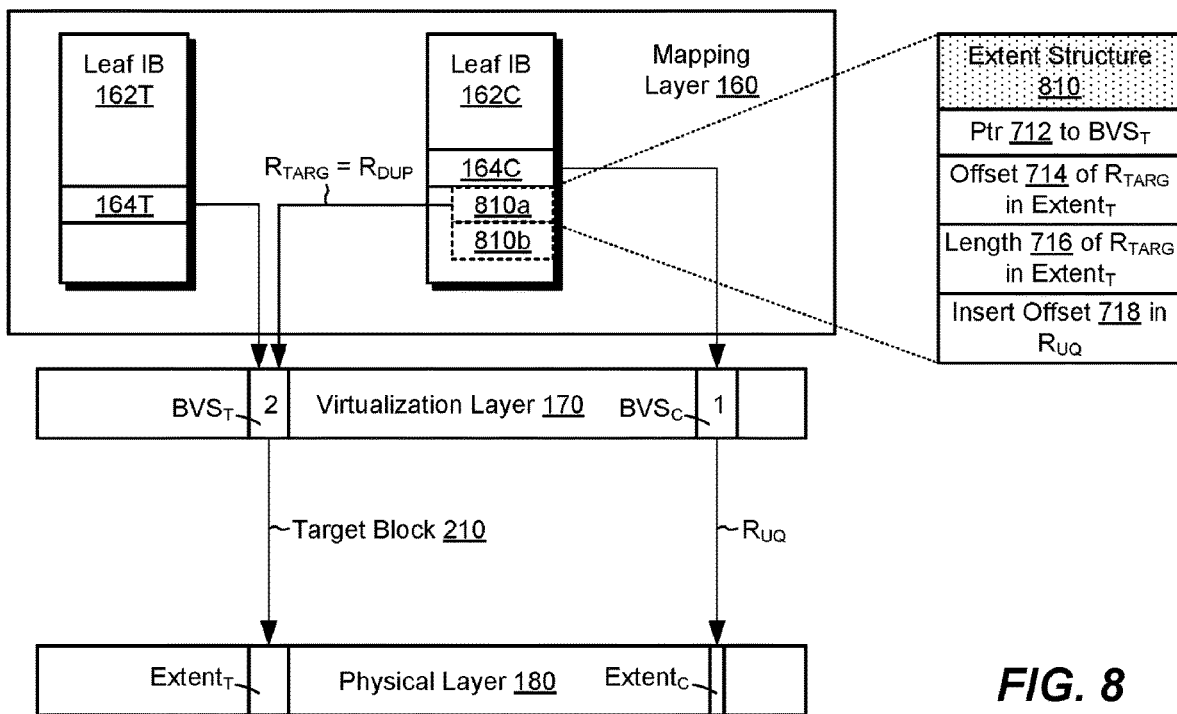
FIG. 8 is a block diagram of an example arrangement where mapping metadata is provided in a mapping layer for supporting deduplication at sub-block granularity.

FIG. 8 shows another example of an extent structure. Rather than being located in BVSc, as was the case in FIG. 7, the extent structure 810 is instead located in leaf IB 162C. Placing the extent structure 810 in the leaf IB has the inherent advantage of avoiding multiple hops. In FIG. 7, for example, the SP 120 would have to access BVSc, read its extent structure 710, and then access BVST. Those accesses would have to be performed in order, one after the other. By contrast, locating the extent structure 810 in the leaf IB, as shown in FIG. 8, allows the SP 120 to access both BVSc and $BVS_T$ in parallel, promoting faster processing.

Between zero and two extent structures are needed for each leaf-IE block pointer, with two extent structures shown here as structures 810a and 810b. As the leaf IB is itself a block, which has limited space, it may be preferable in some examples to compress the contents of the leaf IB when many extent structures 810 are needed. Each leaf IB 162 includes a header and an array of block pointers. In an example, the header is marked with a label that identifies the pointers as compressed or uncompressed, and the array of block pointers (but not the header) is compressed, along with the associated extent structures 810. In this manner, ample space may be made available for any required number of extent structures 810.

Figure 9:
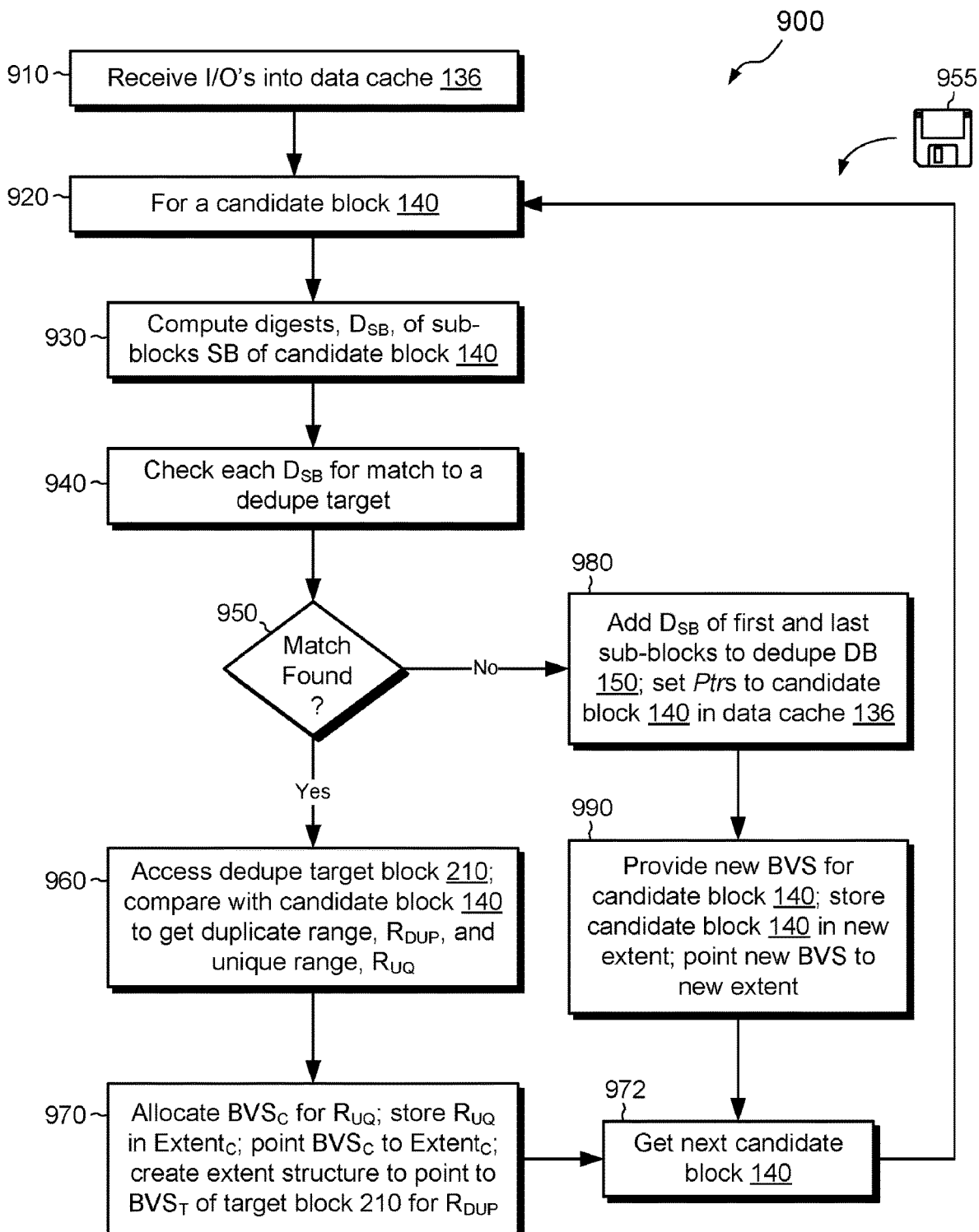
FIG. 9 is a flowchart that shows an example method of processing I/O write requests in the environment of FIG. 1.
Figure 10:
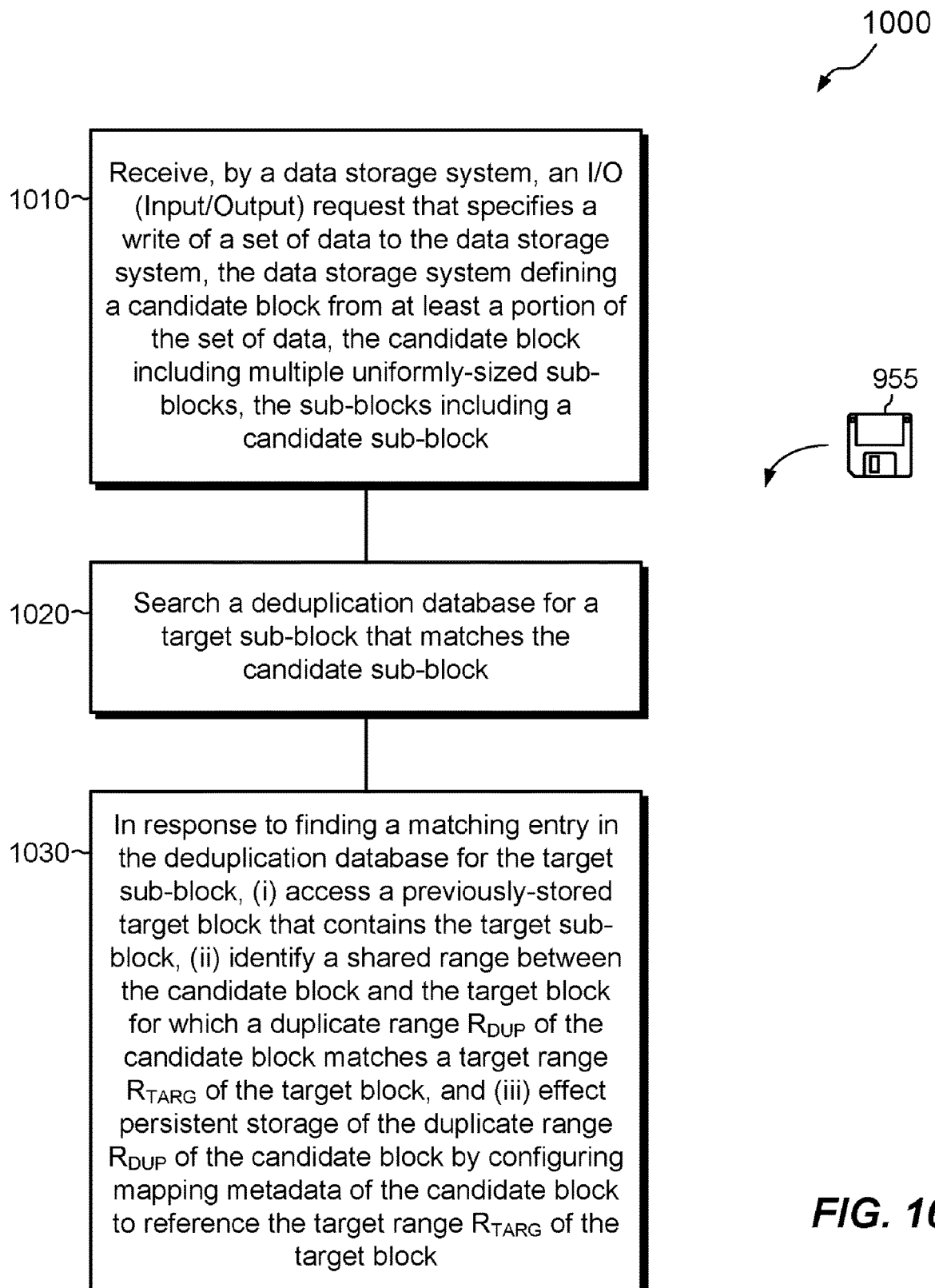
FIG. 10 is a flowchart that shows an example method of performing data deduplication in the environment of FIG. 1.

FIGS. 9 and 10 show flowcharts of processing steps or methods 900 and 1000 that may be carried out in connection with the environment 100. The methods 900 and 1000 are typically performed, for example, by the software constructs described in connection with FIG. 1, which reside in the memory 130 of the storage processor 120 and are run by the set of processors 124. The various acts of methods 900 and 1000 may be ordered in any suitable way. Accordingly, embodiments may be constructed in which acts are performed in orders different from those illustrated, which may include performing some acts simultaneously.

FIG. 9 shows example method 900 of performing inline deduplication at sub-block granularity. At 910, the SP 120 receives sets of data specified in write I/O requests 112 into the data cache 136. The data cache 136 stores the data in block-size buffer caches (blocks). Each such block includes multiple sub-blocks such as sub-blocks 140-0 to 140-7.

At 920, the dedupe manager 132 obtains a candidate block 140 from the data cache 136 and performs various acts relating to deduplication of the candidate block 140. For example, at 930, the dedupe manager 132 computes digests of at least one, but preferably all, sub-blocks 140-1 to 140-7 of the candidate block 140. At 940, the dedupe manager 132 searches the dedupe database 150 for each computed digest. At 950, if a match is found, operation proceeds to 960, whereupon the dedupe manager 132 accesses the target block 210 (or any of the other target blocks described above), by following the reference $Ref_T$ in the matching entry 152. The dedupe manager 132 then compares the candidate block 140 with the target block 210 and identifies the duplicate range $R_{DUP}$ of the candidate block 140, which contains the same data as the corresponding target range $R_{TARG}$ of the target block 210. The dedupe manager 132 also identifies a unique range $R_{UQ}$ of the candidate block 140.

With the duplicate range $R_{DUP}$ and the unique range $R_{UQ}$ identified, operation proceeds to 970, whereupon the SP 120 allocates BVSc for the candidate block 140, stores $R_{UQ}$ in $Extent_C$, and points BVSc to $R_{UQ}$. The SP 120 also effects storage of $R_{DUP}$ by reference, by creating an extent structure 710 (or 810) that points to range $R_{TARG}$ of the target block 210, e.g., by pointing to $BVS_T$ (via pointer 712), specifying the offset 714 and length 716 of $R_{TARG}$ in $Extent_T$, and specifying an insert offset 718 that identifies where $R_{DUP}$ is to be inserted relative to $R_{UQ}$ when reconstructing the candidate block 140. If two distinct duplicate ranges are detected, two extent structures 710 (or 810) may be created. In this manner, the data storage system 116 accounts for and can later access all the data of the candidate block 140 without having to store the duplicate range $R_{DUP}$. At 972, a next candidate block 140 is obtained and the operation described in steps 920-970 is repeated for the new candidate block. Although candidate blocks may be processed serially, as shown, they may also be processed in parallel, e.g., with multiple threads processing respective candidate blocks simultaneously.

Returning to 950, if no match is found to any of the sub-blocks 140-1 to 140-7 of the candidate block 140, operation proceeds to 980, whereupon the dedupe manager 132 creates new entries in the dedupe database 150 for the first and last sub-blocks of the candidate block 140. Creating new entries includes establishing pointers Ptr in each new entry to the candidate block 140 in the data cache 136.

At 990, the SP 120 stores the candidate block 140, without performing deduplication, by providing a new BVS for the candidate block 140, storing the candidate block 140 in a new storage extent, and pointing the new BVS to the new storage extent. Data may be stored in compressed or uncompressed form.

Referring to FIG. 10, shown is a method 1000 of performing data deduplication and summarizes some of the improvements described above. At 1010, a data storage system 116 receives an I/O (Input/Output) request 112 that specifies a write of a set of data 138 to the data storage system. The data storage system 116 defines a candidate block 140 from at least a portion of the set of data 138. The candidate block includes multiple uniformly-sized sub-blocks, e.g., 140-0 to 140-7, and the sub-blocks include a candidate sub-block 140C.

At 1020, a deduplication database 150 is searched for a target sub-block that matches the candidate sub-block 140C. For example, the dedupe manager 132 computes a digest of the candidate sub-block 140C and searches the dedupe database 150 for a matching entry.

At 1030, in response to finding a matching entry 152 in the deduplication database 150 for the target sub-block (e.g., 210T, 310T, etc.), (i) accessing a previously-stored target block (e.g., 210, 310, etc.) that contains the target sub-block, (ii) identifying a shared range between the candidate block 140 and the target block for which a duplicate range $R_{DUP}$ of the candidate block matches a target range $R_{TARG}$ of the target block, and (iii) effecting persistent storage of the duplicate range $R_{DUP}$ of the candidate block 140 by configuring mapping metadata (e.g., 710, 810) of the candidate block 140 to reference the target range $R_{TARG}$ of the target block.

An improved technique has been described for performing data deduplication, which operates at sub-block granularity by searching a deduplication database 150 for a match between a candidate sub-block 140C of a candidate block 140 and a target sub-block of a previously-stored target block. When a match is found, the technique identifies a duplicate range $R_{DUP}$ shared between the candidate block and the target block and effects persistent storage of the duplicate range $R_{DUP}$ by configuring mapping metadata of the candidate block 140 so that it points to the duplicate range $R_{TARG}$ in the target block.

Although techniques have been described for performing data deduplication inline with I/O requests 112 (e.g., also described in more detail in following paragraphs), similar techniques can be applied when performing deduplication in the background. Background deduplication can proceed substantially as described above, except that the dedupe manager 132 obtains candidate blocks 140 from persistent storage, rather than from incoming I/O requests 112. For example, SP 120 reads a data block from persistent storage, computes digests from sub-blocks of the data block, and searches the dedupe database 150 for a match to one or more of the sub-blocks. If the search reveals a match to a previously-stored target block, the SP 120 identifies a duplicate range $R_{DUP}$ and a unique range $R_{UQ}$ of the candidate block 140, effecting storage of the duplicate range $R_{DUP}$ by configuring metadata (e.g., an extent structure 710 or 810 in a BVS or IB) to reference the corresponding range $R_{TARG}$ in the target block. Also, the SP 120 replaces the storage extent that holds the previously-stored version of the candidate block 140 with a new storage extent that stores only the unique range $R_{UQ}$ of the candidate block 140. The new storage extent may be written in place of the original one, with the residual space being freed, or the unique range $R_{UQ}$ may be written to a newly allocated storage extent in the physical layer 180, with the entirety of the extent holding the original candidate block being freed.

Also, the above description has indicated that certain structures "reference" or "point to" other structures. One should appreciate that any such reference or pointing can be direct or indirect, meaning that intervening pointing structures can also be present. Further, although referenced or pointed-to structures may be identified hereinabove as "blocks," such blocks need not be persistently-stored versions. For example, such blocks may be cached versions of data blocks, or memory-resident structures that have not yet been stored on persistent storage devices.

Further, as discussed below, extent structures 710 or 810 (or more generally the block level metadata) can be adapted to store additional metadata for tracking small differences between sub-blocks. For instance, a data comparison of a candidate block with a target block that extends beyond the initially-matching candidate and target sub-blocks (such as shown in FIG. 2B) may reveal small differences between adjacent sub-blocks (of candidate and target blocks) being compared, which sub-blocks are almost but not quite identical. Such differences may extend over only a small number of bytes, which could easily fit into available extra space in extent structures or other block level metadata. Thus, as discussed in more detail elsewhere herein, additional improvements may identify such minor differences (deltas) and store them in metadata along with a pointer to their locations in the block or sub-block. In this manner, the dedupe match can be extended to include the nearly-matching block or sub-block, which becomes part of the duplicate range $R_{DUP}$ and can thus be deduplicated. During a later read, the SP 120 can reconstruct the block in the usual way and then access the delta from the metadata and insert the delta in place of the duplicate data at the indicated location, thus restoring the difference. As described below, such an embodiment may be useful where small differences in sub-blocks of different data blocks arise merely from timestamps, labels, or minor edits.

Consistent with discussion herein, the data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. The data path and control path each define two separate logical flow paths.

An embodiment of a data storage system in accordance with techniques herein may perform different data processing operations or services on stored user data. For example, the data storage system may perform one or more data reduction operations, such as data deduplication and compression as discussed herein, as well as other types of operations or services. Generally, data deduplication and compression techniques are known in the art and any suitable such technique may be used in an embodiment in accordance with techniques herein. In at least one embodiment, the compression technique may be a lossless compression technique such as an algorithm from the Lempel Ziv algorithm family (e.g., LZ77, LZ78, LZW, LZR, and the like). In at least one embodiment in accordance with techniques herein, data deduplication processing performed may include digest or hash value computation using an algorithm such as based on the SHA-256 hashing algorithm known in the art. Data deduplication generally refers to removing redundant or duplicate data portions. Data deduplication techniques may include looking for duplicate sub-blocks whereby only a single instance of the sub-block is retained (stored on physical storage) and where pointers or references may be used in connection with duplicate or redundant copies (which reference or identify the single stored instance of the data sub-block).

Figure 11:
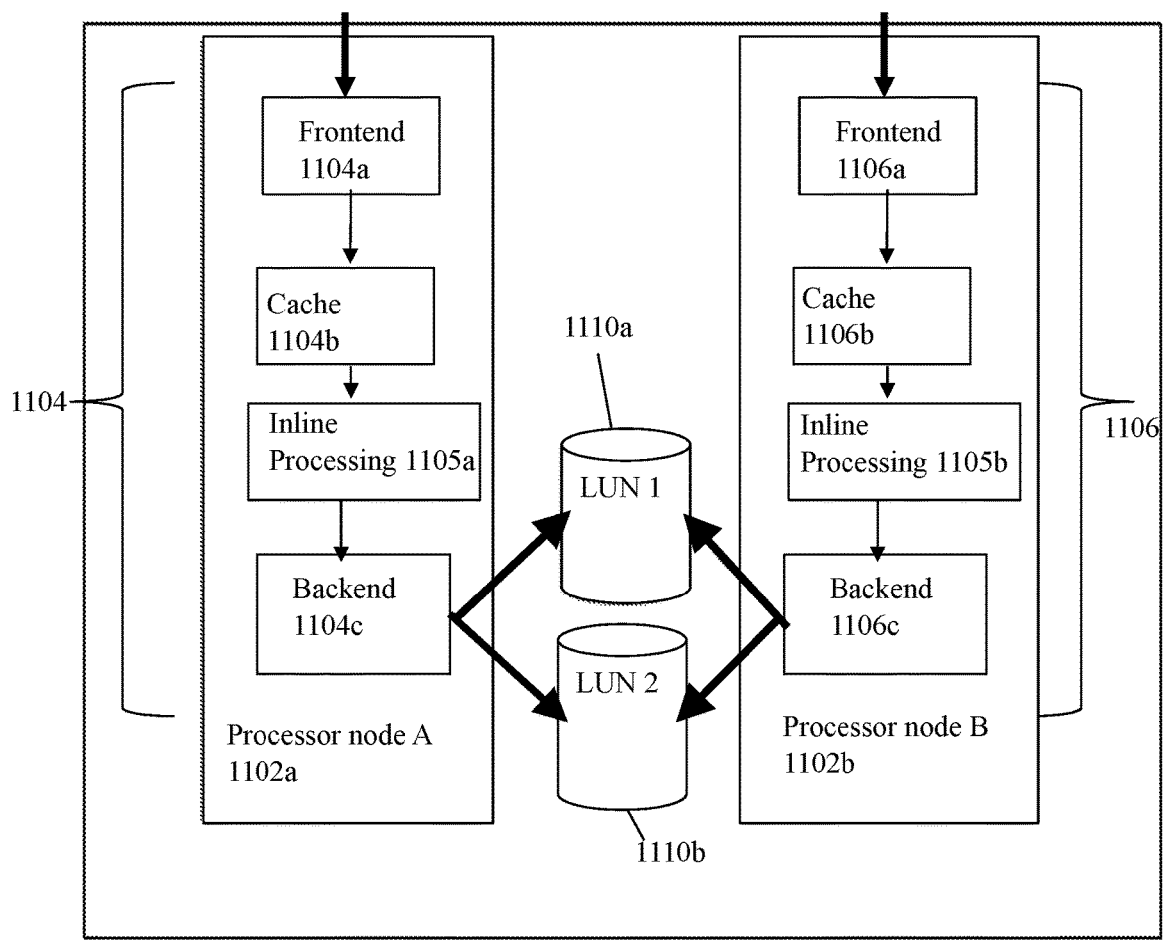
FIG. 11 is an example illustrating in-line processing as may be performed in an embodiment in accordance with techniques herein.

With reference to FIG. 11, shown is an example 1100 illustrating components that may be included in the data path in at least one existing data storage system in accordance with techniques herein. The example 1100 includes two processor nodes A 1102a and B 1102b and associated software stacks 1104, 1106 of the data path where I/O requests may be received by either processor node 1102a or 1102b. In the example 1100, the data path 1104 of processor node A 1102a includes: the frontend (FE) component 1104a (e.g., an FA or front end adapter) that translates the protocol-specific request into a storage system-specific request; a cache layer 1104b (e.g., data cache) where data is temporarily stored; an inline processing layer 1105a; and a back-end (BE) component 1104c that facilitates movement of the data between the cache and permanent non-volatile storage (e.g., back end physical non-volatile storage devices accessed by BE components such as controllers or device interfaces that access the physical storage). During movement of data in and out of the cache layer 1104b (e.g., such as in connection with read and writing data respectively, to physical storage 1110a, 1110b, inline processing may be performed by layer 1105a. Such inline processing operations of 1105a may be optionally performed and may include any one of more data processing operations in connection with data that is flushed from cache layer 1104b to back-end non-volatile physical storage 1110a, 1110b, as well as when retrieving data from back-end non-volatile physical storage 1110a, 1110b to be stored in cache layer 1104b. In at least one embodiment, the inline processing may include performing compression and data duplication. Although in following paragraphs reference may be made to inline processing including compression and data deduplication, more generally, the inline processing may include performing any suitable or desirable data processing operations as part of the I/O or data path (e.g., where such operations may include any of compression and data deduplication, as well as any other suitable data processing operation).

In a manner similar to that as described for data path 1104, the data path 1106 for processor node B 1102b has its own FE component 1106a, cache layer 1106b, inline processing layer 1105b, and BE component 1106c that are respectively similar to components 1104a, 1104b, 1105a and 1104c. Elements 1110a, 1110b denote physical storage provisioned for LUNs whereby an I/O may be directed to a location or logical address to read data from, or write data to, the logical address. The LUNs 1110a, 1110b are examples of storage objects representing logical storage entities included in an existing data storage system configuration. Since, in this example, writes directed to LUNs 1110a, 1110b may be received for processing by either of the nodes 1102a and 1102b, the example 1100 illustrates what may also be referred to as an active-active configuration.

In connection with a write operation as may be received from a host and processed by processor node A 1102a, the write data may be written to the cache 1104b, marked as write pending (WP) denoting it needs to be written to physical storage 1110a, 1110b and, at a later point in time, the write data may be destaged or flushed from the cache to the physical storage 1110a, 1110b by the BE component 1104c. The write request may be considered complete once the write data has been stored in the cache whereby an acknowledgement regarding the completion may be returned the host (e.g., by component 1104a). At various points in time, WP data stored in the cache is flushed or written out to physical storage 1110a, 1110b. In connection with inline processing layer 1105a, prior to storing the original data on physical storage 1110a, 1110b, compression and data deduplication processing may be performed that converts the original data (as stored in the cache prior to inline processing) to a resulting form (that may include compressed and/or deduplicated portions) which is then written to physical storage 1110a, 1110b. In at least one embodiment, when deduplication processing determines that a portion (such as a block or one or more sub-blocks) of the original data is a duplicate of an existing data already stored on 1110a, 1110b, that particular portion of the original data is not stored in a compressed form and may rather be stored in its deduplicated form (e.g., there is no need for compression of a block or sub-blocks determined to be duplicates of other existing data). If an original data portion is not a duplicate of an existing portion already stored on 1110a, 1110b, the original data portion may be compressed and stored in its compressed form on 1110a, 1110b.

In connection with a read operation to read a block of data, a determination is made as to whether the requested read data block is stored in its original form (in cache 1104b or on physical storage 1110a, 1110b), or whether the any portion requested read data block was previously deduplicated or compressed. If the requested read data block (which is stored in its original decompressed, non-deduplicated form) is in cache, the read data block is retrieved from the cache 1104b and returned to the host. Otherwise, if the requested read data block is not in cache 1104b but is stored on physical storage 1110a, 1110b in its original form, the requested data block is read by the BE component 1104c from the backend storage 1110a, 1110b, stored in the cache and then returned to the host.

If any sub-block of the requested read data block was previously deduplicated, the original corresponding sub-blocks of the read data block are recreated and stored in the cache in its original form so that it can be returned to the host. If the requested read data block, or unique sub-block thereof, was previously compressed, the block (or compress portion thereof) is first decompressed prior to sending the read data block to the host. If the compressed read data block or sub-blocks are already stored in the cache, the data may be uncompressed to a temporary or buffer location, the uncompressed data is sent to the host, and the buffer or temporary location is released. If the compressed read data block (or compressed sub-blocks thereof) is not in cache but stored on physical storage 1110a, 1110b, the compressed read data block (or compressed portions thereof) may be read from physical storage 1110a, 1110b into cache, uncompressed to a buffer or temporary location, and then returned to the host. Thus, requested read data stored on physical storage 1110a, 1110b may be stored in a deduplicated or compressed form as noted above where processing is performed by 1105a to restore or convert the deduplicated or compressed form of the data to its original data form prior to returning the requested read data to the host.

When the processor performs processing, such as in connection with inline processing 1105a, 1105b as noted above, data may be loaded into cache. In particular, inline compression (ILC) and inline data deduplication (ILD) may be performed as part of inline processing 1105a, 1105b. In at least one embodiment as noted above, the size of a data block processed by ILC and ILD may be 4K bytes where the block is partitioned into 8 equal sized portions (e.g., 512 bytes each) referred to as sub-blocks or sectors.

In at least one embodiment in accordance with techniques herein, following paragraphs may provide examples of deduplication processing performed inline as part of the I/O or data path, as described above in connection with ILC and ILD processing of FIG. 11. However, it should be noted that techniques herein are more generally applicable for use in deduplication performed which is not inline or not part of the I/O or data path, such when processing a data set offline or in the background.

Described above are techniques that may be used for performing data deduplication that provide for a smaller or finer level of granularity for determining matching or duplicate data portions at the sub-block or sector level. What will now be described are additional techniques that may be used to further optimize the processing described above.

In some data sets or I/O streams analyzed, it may be observed that multiple data blocks are identical except for a single difference or delta region, which may also be referred to herein as a tag. User data may include a compact unique tag as part of a data block. For example, tags may be unique user metadata (MD) included in the data block. A tag is a logically contiguous region of a block. Examples of tags denoting such user MD may include unique identifiers used by virtual machines (VMs) in virtualized environments, database identifiers, time stamps, or other serialization data stamps. In an embodiment in accordance with techniques herein, the tags of data blocks may be detected and stored as part of the deduplication related metadata of deduplicated blocks. Such deduplication related metadata may be stored in cache such as in memory 130 of FIG. 1. It should be noted that the foregoing is merely one non-limiting example of a delta or difference that may exist between two data blocks that are otherwise identical whereby one of the blocks is detected as a duplicate of the second block, but for the detected difference, which is referred to herein as a tag. More generally, the term tag as used herein may be any detected delta or difference region located anywhere in a data block, or sub block thereof, having a size or length less than a specified maximum.

Figure 12:
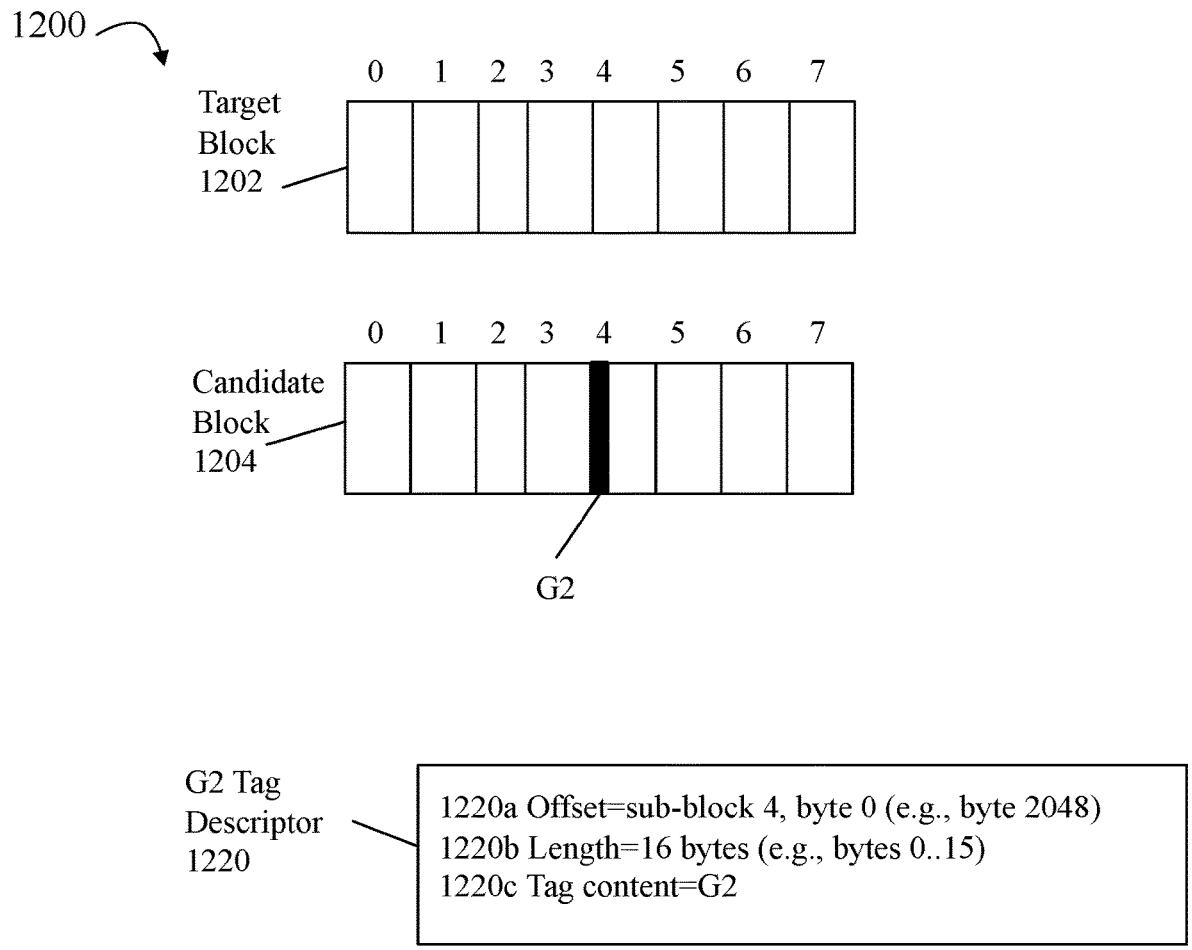
FIGS. 12, 13, 14, 15 and 16 are examples illustrating use of techniques herein with deduplication of data blocks including tags in an embodiment in accordance with techniques herein.

Referring to FIG. 12, shown is an example 1200 illustrating two data blocks for which deduplication processing may be performed in an embodiment in accordance with techniques herein. The example 1200 includes two data blocks 1202, 1204 each including 8 sub-blocks identified as sub-blocks 0 through 7. Data block 1204 includes a different tag G2 in its sub-block 4.

As a first case consistent with the illustration in FIG. 12, the 2 data blocks 1202, 1204 may be identical to one another other than the tag G2 of data block 1204. Thus, the two data blocks 1202, 1204 may not be deduplicated entirely due to the tag G2 in the block 1204. For example, assume 1202 is the target block (having all unique sub-blocks with digests D1 and D2 for its first and last sub-blocks stored in the deduplication DB 150) and 1204 is the candidate block. Sub-block deduplication described above may look for duplicate sub-blocks in 1204 based on first determining a match between digests of sub-blocks 0 and 7 of target 1202 and the digest for any of sub-blocks 0-7 of candidate 1204. In this case, a partial deduplication match may be found based on sub-block 0 of target block 1202 and sub-block 0 of candidate 1204. For example, sub-blocks 0-3 of target block 1202 may match sub-blocks 0-3 of candidate block 1204. However, due to the tag G2 there is no match between sub-block 4 of both 1202 and 1204. A partial deduplication match may be found based on sub-block 7 of target block 1202 and sub-block 7 of candidate 1204. For example, sub-blocks 5-7 of target block 1202 may match sub-blocks 5-7 of candidate block 1204. However, again, due to the tag G2 there is no match between sub-block 4 of both 1202 and 1204.

In at least one embodiment, the size of the tag may be less than the size of a single sub-block or sector. For example, in at least one embodiment, the size of the tag may be less than 16 bytes in length, less than 32 bytes in length, or some other specified maximum tag size less than the size of a single block or sector. In at least one embodiment, the tag generally may be located anywhere within a data block. For example, although the example of FIG. 12 shows tag G2 as aligning on a sector of sub-block boundary, generally the tag may or may not be aligned on a sector or sub-block boundary. Although the example of FIG. 12 shows tag G2 as being included in a single sector of sub-block, generally the tag may or may not be included in a single sub-block. The tag may, for example, cross over a sub-block boundary and be located in two different sub-blocks.

In at least one embodiment in accordance with techniques herein, processing may be performed prior to other deduplication processing for a candidate data block, or sub-block, to detect whether the candidate block has a tag and, if so, extract information about the tag. Such information may be stored in a tag descriptor associated with the tag where the tag descriptor (and thus extracted tag information) includes the location or offset of the tag in the candidate block, the length of the detected tag, and the value or content of the tag. Once a tag in a candidate block has been detected and information about the tag extracted (which is then stored in the tag descriptor), the candidate block as stored in a memory buffer may have the offset locations containing the tag data or content ignored in connection with subsequent comparisons or searches performed for identical blocks and/or sub-blocks. In at least one embodiment, a bitmap or other structure may be used to represent the bytes in a particular data block containing the tag and thus the particular bytes or offsets of the data block that should be ignored or excluded when performing data deduplication, such as when performing comparisons to determine duplicate or identical sub-blocks. It should be noted that the tag descriptor and its associated fields as described herein are one example of information that may be stored in a tag descriptor. An embodiment may generally include any desired tag information in the descriptor. Additionally, an embodiment may represent particular items of tag information, such as tag location within the data block, in any suitable manner. For example, the tag descriptor used in examples herein represents tag location using a starting offset and length. In an embodiment in which tags may be assumed to all have the same fixed length such as 16 bytes (e.g., rather than possible varying length with a maximum size of 16 bytes) the 16 byte length may be implied and therefore not explicitly stored as part of the tag descriptor.

In connection with the example 1200, the target block 1202 may have been previously processed with all its sub-blocks determined as unique and not de-duplicable. As discussed above, the digests D1 and D2 along with associated information may be stored in the dedupe DB 150 of FIG. 1.

The candidate block 1204 may also be processed to detect the occurrence of the tag G2 in its sub-block 4. In this non-limiting example, assume all tags are 16 bytes in length. Tag information about G2 is stored in the G2 tag descriptor denoted by 1220 and may include:

the starting offset 1220*a* within the target block of where the tag G2 is located (e.g., this may be a byte offset location of 2048 denoting tag G2 starts at sub-block 4, offset 1 in candidate block 1204);

the length of the tag G1 1220*b* within the candidate block 1204 (e.g., this may be 16 bytes); and the tag content or data value 1220*a* (e.g., this may be the tag value or content G2).

As part of deduplication processing, a comparison may be made between the sub-blocks in candidate block 1204 and corresponding sub-blocks in the target block 1202. For example, deduplication processing as described in connection with FIG. 1 and others herein may performed where the dedupe DB 150 is examined to determine whether there is an existing entry in the dedupe DB 150 that matches any digest for sub-blocks 0-7 of the candidate block 1204. Since sub-block 4 of candidate 1204 includes the tag G2, the digest for sub-block 4 of 1204 may be computed without (e.g., ignoring) the tag G2. In this example, assume that processing locates a matching entry in the dedupe DB 150 for digest X0 of sub-block 0 of 1204. As confirmation, processing then compares sub-block 0 of candidate block 1204 (e.g., 1204(0)) to sub-block 0 of target block 1202 (e.g., 1202(0)), and determines that the two blocks match. Similarly, deduplication processing may determine that sub-blocks 1-3 of target block 1202 match corresponding sub-blocks 1-3 of the candidate block 1204. When comparing sub-block 4 of candidate block 1204 (e.g., 1204(4)) to sub-block 4 of target block 1202 (e.g., 1202(4)), processing may determine that the two sub-blocks also match since such comparison ignores the particular byte locations in 1204 corresponding to tag G2. Thus, candidate sub-block 1204(4) matches target 1202(4) without the tag content for tag G2. By ignoring the tag G2 in 1204, deduplication processing may determine that the candidate block 1204 is byte for byte identical to the target block 1202.

Thus, with the tag extracted from (e.g., ignored in) block 1204, processing may further continue and determine that all sub-blocks 0-7 of target block 1202 match corresponding sub-blocks 0-7 of candidate block 1204, thereby indicating candidate 1204 is a duplicate data block of target block 1202 (less any tags). In this manner, a single same physical copy of the target block 1202 is a duplicate data block for the candidate block 1204 where the small difference of the extracted tag G2 may be further added to the candidate block 1204 when reconstructing or composing the original candidate block 1204 (e.g., such as in connection with reads). In connection with processing initially performed for target block 1202, all sub-blocks 0-7 of 1202 may be unique (no duplicate sub-blocks) and thus all sub-blocks of 1202 may be stored persistently in physical storage. In an embodiment, the sub-blocks 0-7 of the target block 1202 may be stored in compressed form persistently in physical storage.

When reconstructing the original form of the target block 1202, the compressed form of target block 1202 may be retrieved from physical storage and decompressed into a buffer returned to the client, such as a client that issued a read request for the target block. When reconstructing the original form of the candidate block 1204, the compressed form of target block 1202 may be retrieved from physical storage and decompressed into a buffer. Subsequently, the buffer locations corresponding to the tag G2 locations as denoted by the G2 tag descriptor 1220 may be overwritten with the tag G2 content 1220*c*. After the buffer has been overwritten with the tag G2 content 1220*c*, the buffer may be returned to the client, such as a client that issued a read request for the candidate block.

Figure 13:
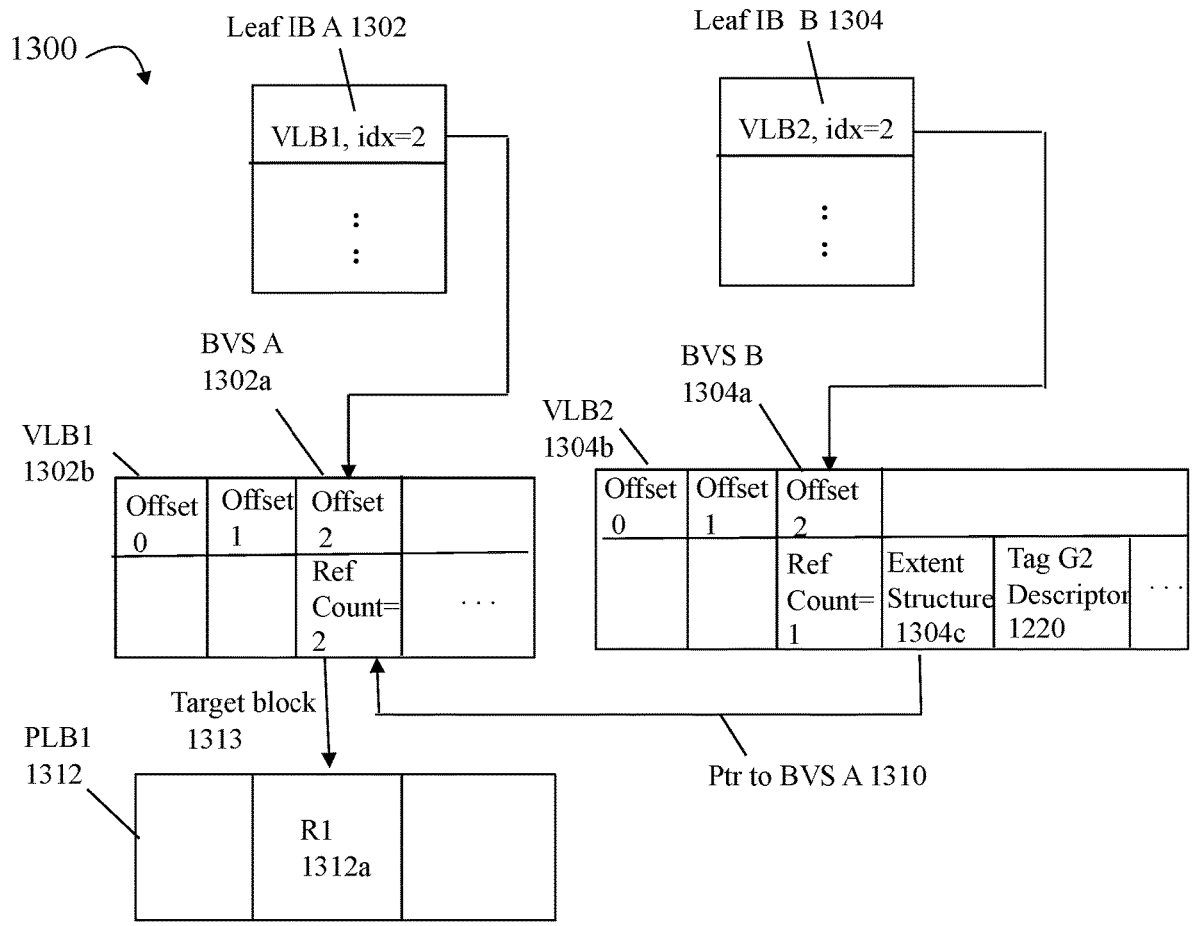

Referring to FIG. 13, shown is an example illustrating example structures that may be used in an embodiment in accordance with techniques herein. The example 1300 illustrates the structures that may be used in connection with representing the target data block 1202 and candidate data block 1202 as discussed above in connection with FIG. 12 where the candidate block 1204 has tag G2 descriptor 1220. Leaf IB A 1302 and Leaf IB 1304 may be located in the mapping layer 160. VLB1 1302*b* (virtualization layer block 1) and VLB2 1304*b* may be located in the virtualization layer 170. PLB1 (physical layer block 1) may be physical storage of the physical layer 180 including the actual unique data sub-blocks (e.g., content stored in different sub-blocks).

The leaf IB A 1302 provides the mapping for target block 1202. The leaf IB A 1302 points to BVS A 1302*a* located at VLB1, offset or index 2. As described herein, the BVS A 1302*a* may include a reference count=2. The BVS A 1302*a* also identifies, or points to 1313, the physical location or region R1 1312*a* at which the target block data is stored. The BVS A 1302*a* has a reference count of 2 reflecting the fact that two pointers point to (e.g., reference) it—the leaf IB A 1302 pointer and the pointer 1310 in BVS B 130*b*/extent structure 1304*c*.

The leaf IB B 1304 provides the mapping for candidate block 1204. The leaf IB B 1304 points to BVS B 1304*a* located at VLB2, offset or index 2. As described herein, the BVS B 1304*a* may include a reference count=1 and may also include the tag G2 descriptor 1220. The BVS B 1304*a* includes extent structure 1304*c* since the candidate block has been deduplicated, where the extent structure 1304*c* includes information identifying the deduplicated portion of the candidate block and also pointing to the BVS A 1302*a* used to access the content of the target block (which is identical to that of the candidate block). Thus, the extent structure 1304*c* points 1310 to BVS A 1302*a* (located at VLB1, offset 2). The BVS B 1304*a* has a reference count of 1 reflecting the fact that one pointer points to (e.g., references) BVS B 1304*a*—the leaf IB B 1304. In the example 1300 of FIG. 13, the tag G2 descriptor 1220 may be stored as part of the metadata structures of the candidate data block 1204.

Figure 14:
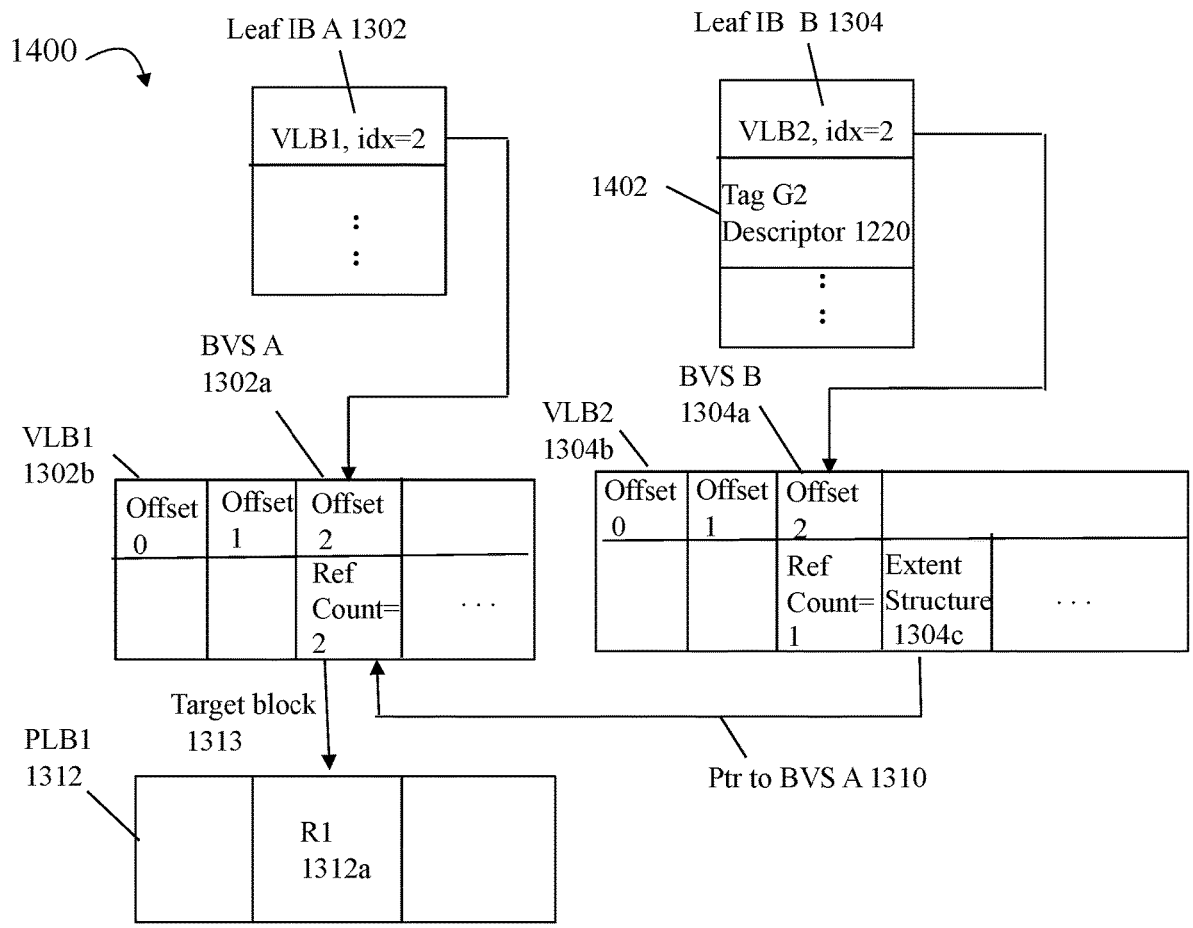

Referring to FIG. 14, shown is an example illustrating example structures that may be used in an embodiment in accordance with techniques herein. The example 1400 illustrates the structures as described in connection with FIG. 13 with the difference that, as denoted by 1402, the Tag G2 descriptor 1220 is located in the IB leaf B 1304 rather than the BVS B 1304*a*. Consistent with other discussion herein, such as in connection with FIG. 8, the extent structure 1304*c* may also alternatively be located in the IB leaf B 1304 rather than the BVS B 1304*a* (as illustrated). More generally, the tag G2 descriptor 1220 may be located in any suitable structure and stored as part of the associated candidate data block's metadata.

Generally, it should be noted that either the target block alone, the candidate block alone, or both the candidate block and target block may contain a unique tag. Processing for sub-block level deduplication may be performed as described herein with the removal and ignoring of any tag stored in a candidate and/or target block. In at least one embodiment, the tag may be detected as a small (e.g., 16 bytes or less) delta between the dedupe target and candidate blocks. When a tag is detected in a block, information for the tag 1220 may be stored in a tag descriptor as part of the block's metadata, such as illustrated in FIGS. 13 and 14. The tag descriptor 1220 may include the tag value or content and the tag's offset and length with respect to where the tag is located in the data block. The foregoing allows processing to deduplicate such candidate blocks with the tag extracted or ignored (e.g., for a candidate block with a tag, the candidate block may be deduplicated as being a duplicate of a target block without a tag, knowing that the tag of the candidate block needs to be overwritten at the stored offset with the stored tag when we need to reconstitute or reconstruct the deduplicated candidate block). Storing the tag descriptor as a relatively small amount of data as part of the block locator metadata results in much less retrieval overhead as compared, for example, to storing and retrieving the tag as a regular data block, or otherwise having less deduplicated sub-blocks.

In at least one embodiment, a maximum threshold size may be used in connection with tags detected having tag information stored as a tag descriptor with the data block's own metadata, such as illustrated in FIGS. 13 and 14. Any suitable maximum threshold size or length may be used. For example, as noted above, tags may be generally less than the size or length of a single data sub-block or sector, or some other smaller suitable size, such as 16 bytes, 32 bytes, and the like.

Note that the foregoing may be further generalized, whereby the detected delta region corresponding to a unique tag is longer that the maximum allowed length, but the rest of the candidate block data still matches the target data. In such a case, the delta region may be stored as a separate partial block (utilizing the common block data storage scheme, with its own block locator metadata), and when needed, can be retrieved and copied over the candidate block's data which itself was retrieved by first reading the dedupe target's data, at the stored offset. In this case, the method of constructing a candidate block may include reading the target block's data (as represented without any target block tag, where the tagless target data block matches the candidate block less any candidate block tag), and then overwriting part of the tagless target data block with a stored delta region.

As noted herein, tags of data blocks may be discovered in any suitable manner. For example, in at least one embodiment, tags such as user metadata tags, may be located at particular offsets, locations or sub-blocks in a data block. For example, tags may be located at beginning offset 0 in sub-block 0 of data blocks of a data set. As another example, tags may be detected based on known expected patterns, such as the first N bytes of the tag include particular values, types of values, data in an associated format, (e.g., known timestamp format), and the like.

In at least one embodiment, processing may be performed to detect a tag in a candidate block where the tag may be located at any offset in the block and may have a size or length less than a specified maximum threshold. In such an embodiment, a byte by byte or word by word comparison may be made between the candidate data block and a target data block to determine a contiguous difference or delta region. For example, a first scan may be performed from the last byte of the candidate backward until processing determines a first occurrence of non-matching byte or word of a target. The offset in the target of the non-matching byte or word for the first scan is noted. A second scan may be performed from the first byte of the candidate backward until processing determines a first occurrence of a non-matching byte or word of a target. The offset in the target of the non-matching byte or word for the second scan is noted. The distance or difference between the two offsets may be determined. If the target data block and the candidate data block differ by no more than a single contiguous difference region that is no larger than the specified maximum threshold size of tag (e.g., distance or difference not larger than specified maximum threshold), then the detected single contiguous difference region within the candidate data block may be recognized as the tag of the candidate data block. In such an embodiment, the target block may be selected, for example, by initially performing a lookup in the dedupe DB 150 to locate a matching entry for a digest of sub-block 0 or sub-block 7 of the candidate.

As illustrated in connection with FIGS. 12, 13 and 14, it may be that the target block itself may not include any recognized tag. Alternatively, the target block may also include a tag which may be determined in any suitable manner. Consistent with discussion herein, the tag of the target block may also be extracted and stored in a manner similar to that as in FIGS. 12, 13 and 14 for candidate block 1204 where the target block's tag is ignored in connection with deduplication processing.

Figure 15:
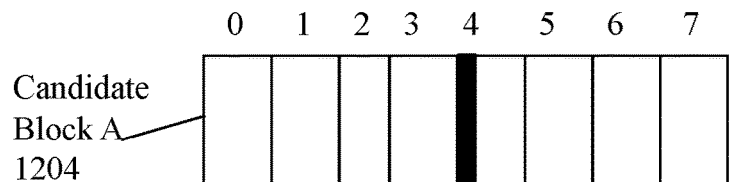
Figure 15:
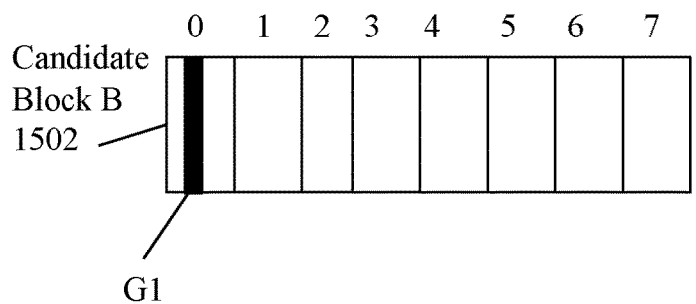

Consistent with discussion herein, two blocks, such as two candidate blocks, may each have a different unique tag located at different offsets. For example, reference is made to FIG. 15. The example 1500 includes candidate block A 1204 and associated G2 tag descriptor 1220 as described above in connection with FIG. 12. Further now assume that a second candidate block B 1502 is received for deduplication processing and processing is first performed to determine whether the data block 1502 includes a tag, and if so, where the tag is located. In this example, assume that processing determines that the candidate block B 1502 includes tag G1 located in sub-block 0 and is determined to have associated G1 tag descriptor 1520. In a manner similar to as described above in connection with candidate block 1204, the G1 tag descriptor 1520 for candidate block 1502 may be stored in block-level metadata of the block 1502 (e.g., as illustrated in FIGS. 13 and 14).

Deduplication processing may be performed that determines the candidate block B 1502, without its tag G1, is also a duplicate of target block 1202. In at least one embodiment, processing as described herein for sub-block data deduplication may be performed in which the digests for each of the 8 sub-blocks 0 through 7 of candidate block 1502 are determined. Since sub-block 0 of candidate 1502 includes the tag G1, the digest for sub-block 0 of 1502 may be computed without (e.g., ignoring) the tag G1. As part of deduplication processing, a comparison may be made between the sub-blocks in candidate block 1502 and corresponding sub-blocks in the target block 1202. For example, deduplication processing as described in connection with FIG. 1 and others herein may performed where the dedupe DB 150 is examined to determine whether there is an existing entry in the dedupe DB 150 that matches any digest for sub-blocks 0-7 of the candidate block 1502. In this example, assume that processing does not locate a matching entry in the dedupe DB 150 for digest W0 of sub-block 0 of 1502 due to the tag content. However, assume that a matching entry in the dedupe DB 150 is located for the digest of sub-block 7 of 1502. As confirmation, processing then compares sub-block 7 of candidate block 1502 (e.g., 1502(7)) to sub-block 7 of target block 1202 (e.g., 1202(7)), and determines that the two sub-blocks match. Similarly, deduplication processing may then search backward and determine that sub-blocks 1-6 of target block 1202 match corresponding sub-blocks 1-6 of the candidate block 1502. When comparing sub-block 0 of candidate block 1502 (e.g., 1502(0)) to sub-block 0 of target block 1202 (e.g., 1202(0)), processing may determine that the two sub-blocks also match since such comparison ignores the particular byte locations in 1502 corresponding to tag G1. Thus, candidate sub-block 1502(0) matches target 1202(0) without the tag content for tag G1. By ignoring the tag G1 in 1502, deduplication processing may determine that the candidate block 1502 is byte for byte identical to the target block 1202.

Figure 16:
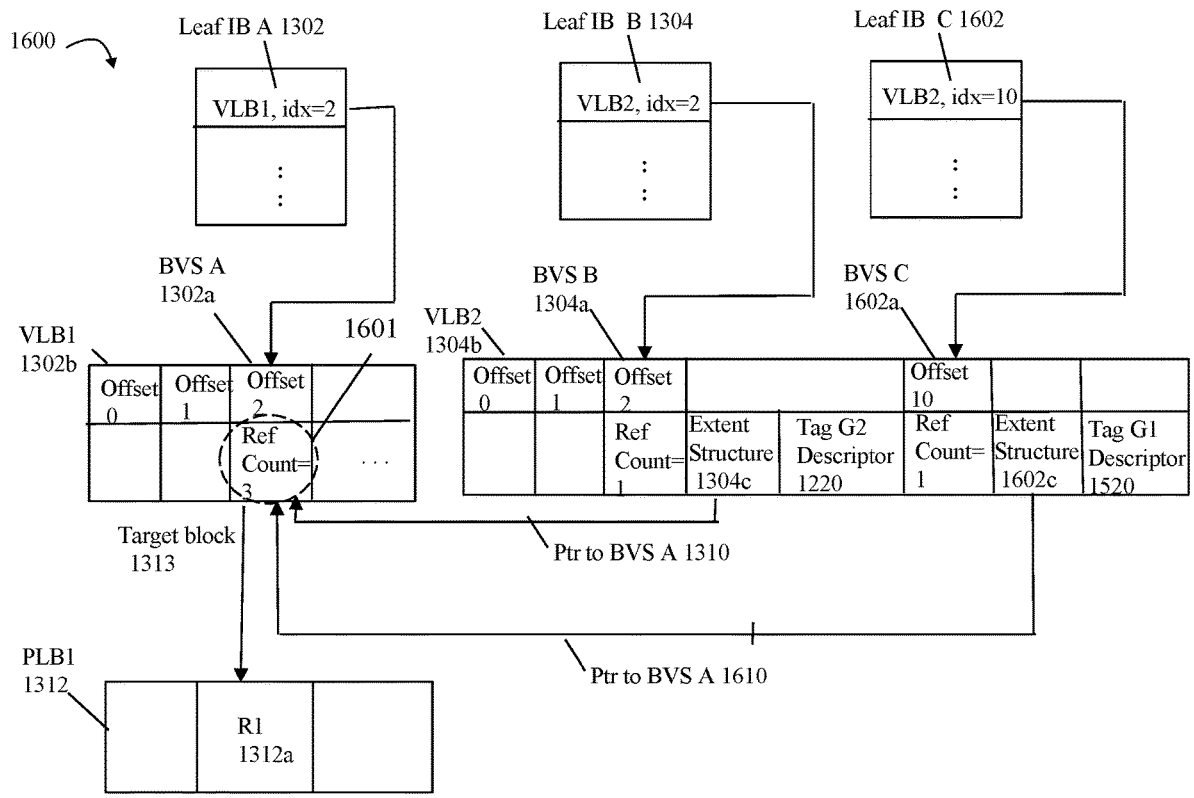

Referring to FIG. 16, shown is an example of the structures that may be used in an embodiment in accordance with techniques herein. The example 1600 includes structures as described in FIG. 13 which have been further updated to reflect the additional candidate block 1502 that has been detected as including tag G1 and, except for tag G1, is a duplicate of target block 1202.

The leaf IB C 1602 provides the mapping for candidate block 1502. The leaf IB C 1602 points to BVS C 1602a located at VLB2, offset or index 10. As described herein, the BVS C 1602a may include a reference count=1 and may also include the tag G1 descriptor 1520. The BVS C 1602a includes extent structure 1602c since the candidate block has been deduplicated, where the extent structure 1602c includes information identifying the deduplicated portion of the candidate block and also pointing 1610 to the BVS A 1302a used to access the content of the target block (which is identical to that of the candidate block). Thus, the extent structure 1602c points 1620 to BVS A 1302a (located at VLB1, offset 2). The BVS A 1302a has an updated reference count of 3 reflecting the fact that 3 pointers now points to (e.g., reference) BVS A 1302a—the leaf IB B 1302, the pointer in BVS B 1304a (that points 1310 to BVS A 1302a), and the pointer in BVS C 1602a (that points 1610 to BVS A 1302a).

In at least one embodiment in accordance with techniques herein, some data deduplication may be attempted in connection with tag detection of a candidate data block. For example, as described above, processing may be performed to detect a tag in a candidate block where the tag may be located at any offset in the block and may have a size or length less than a specified maximum threshold. In such an embodiment, a byte by byte or word by word comparison may be made between the candidate data block and a target data block to determine a contiguous difference or delta region. As described above, processing may include performing a first scan (e.g., from the last byte of the candidate backward until processing determines a first occurrence of non-matching byte or word of a target) and a second scan (e.g., from the first byte of the candidate backward until processing determines a first occurrence of a non-matching byte or word of a target.) In connection with such processing, if a tag is detected in a candidate data block as compared to the target block (already deduped), then it may be determined that the candidate block is identical to the target block, but for any tag in the candidate or target block. In this manner in such an embodiment, one form of block-level deduplication may be performed in connection with tag detection.

Figure 17:
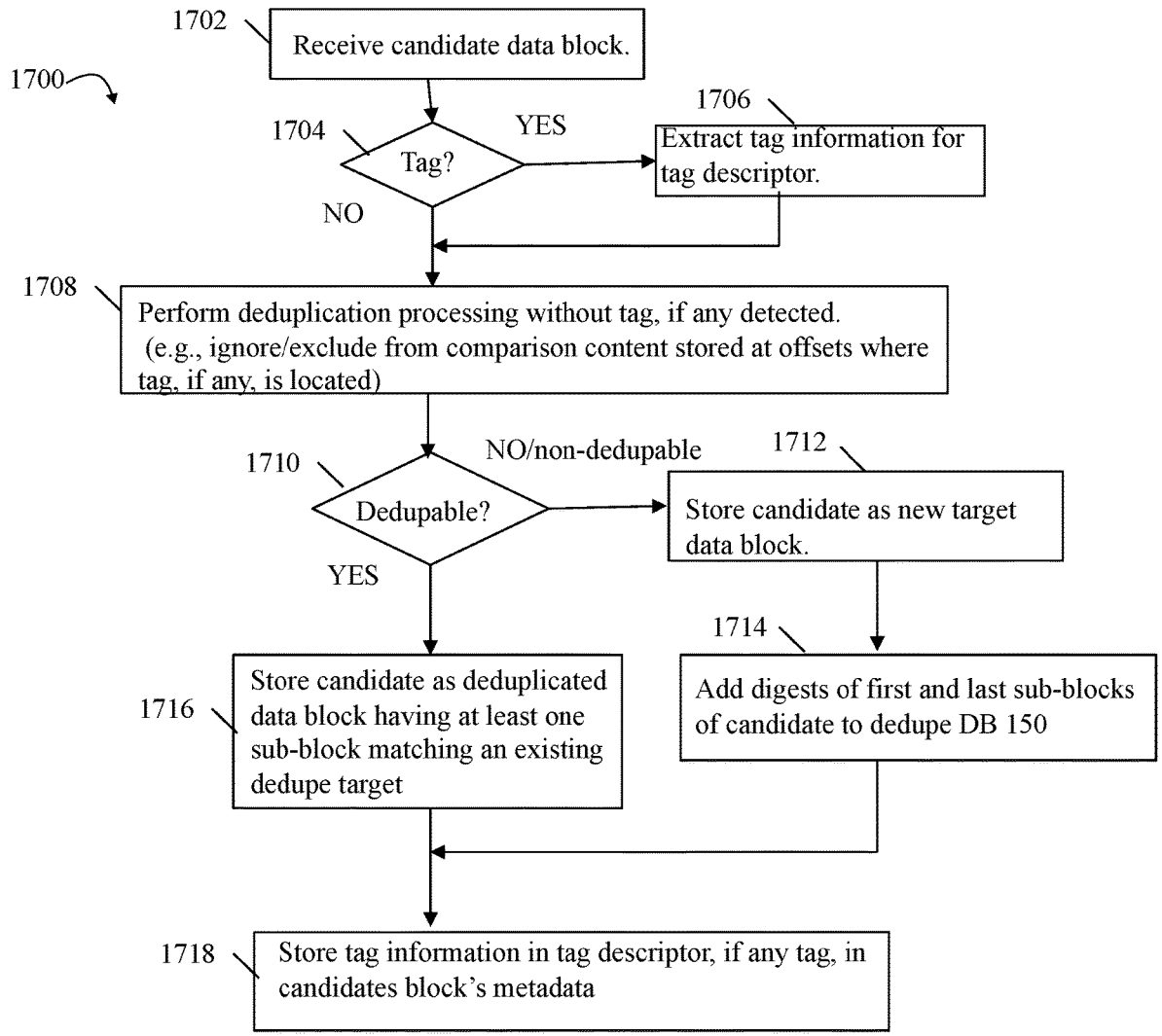
FIGS. 17 and 18 are flowcharts of processing steps that may be performed in an embodiment in accordance with techniques herein.

Referring to FIG. 17, shown is flowchart of processing steps that may be performed in an embodiment in accordance with techniques herein. The flowchart 1700 summarizes processing that may be performed in connection with storing or writing a candidate data block received in step 1702. For example, the candidate block may be written in connection with a write operation and the candidate data block is now being destaged from cache as part of inline processing of the I/O or data path. Alternatively, the candidate data block may be processed in connection with other operations or tasks, such as background deduplication processing performed of an existing stored data set. From step 1702, control proceeds to 1704 where a determination is made as to whether the candidate data block has a tag. If step 1704 evaluates to yes, processing proceeds to step 1706 to extract tag information about the detected tag. The tag information may be stored in a tag descriptor (in a subsequent step 1718 in this example flowchart of steps). The tag information may include the tag data content or value and may identify the location (e.g., starting offset and length) in the candidate data block at which the tag is located. From step 1706 control proceeds to step 1708. If step 1704 evaluates to no, control proceeds to step 1708.

In step 1708, deduplication processing is performed ignoring or without considering any tag detected in the candidate block. As described herein, deduplication processing ignores or excludes from comparison any content stored at offsets where the tag, if any, is located. In at least one embodiment in which a byte or word level comparison is made, the positions at which a tag has been determined may be viewed as "don't care" inputs to the comparison. As such, comparisons made to determine whether particular sub-blocks are identical may omit or exclude performing such comparisons with respect to corresponding locations or offsets at which the tag is located. Step 1708 processing may include performing sub-block level data deduplication as described herein while excluding from comparison any content stored at offsets where the tag, if any, is located. From step 1708, control proceeds to step 1710 where a determination is made as to whether the candidate data block is deduplicatable. Step 1710 may determine that the candidate data block is deduplicatable if at least one sub-block of the candidate is found to be a duplicate of another target, excluding any target and candidate tags. If step 1710 evaluates to no, meaning that all sub-blocks in the candidate are unique/not a duplicate, then control proceeds to step 1712. At step 1712, processing is performed to store the candidate as a new target data block, as described elsewhere herein.

Step 1712 may include, for example, processing as described in connection with step 990 of FIG. 9. Depending on the particular embodiment, step 1712 may include storing sub-blocks of the candidate data block in compressed form. From step 1712, control proceeds to step 1714 where digests and associated information of the first and last sub-blocks of the candidate are added to the dedupe DB 150. Step 1714 may include processing, for example, as described in step 980 of FIG. 9. From step 1714, control proceeds to step 1718 where the tag information, if any, is stored in the tag descriptor included in the candidate block's metadata.

If step 1710 evaluates to yes, control proceeds to step 1716 where processing is performed to store the candidate as a deduplicated data block have at least one sub-block matching an existing dedupe target. Step 1716 may include processing as described herein, for example, such as in connection with steps 960 and 970 of FIG. 9. Depending on the particular embodiment, step 1716 may include storing any unique sub-blocks of the candidate data block in compressed form. From step 1716, control proceeds to step 1718.

Figure 18:
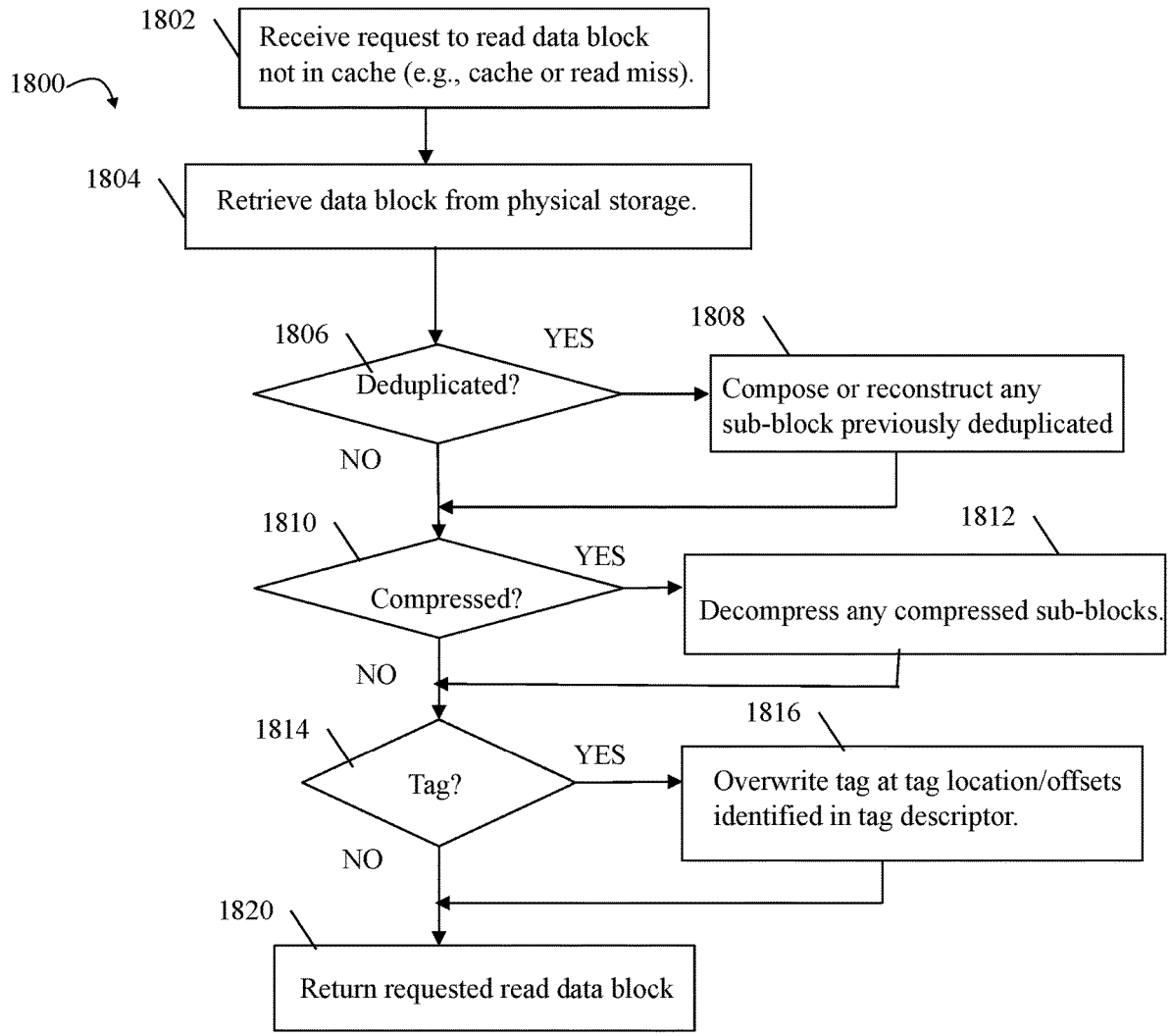

Referring to FIG. 18, shown is another flowchart of processing steps that may be performed in an embodiment in accordance with techniques herein. The flowchart 1800 summarizes processing that may be performed in connection with reading a data block in connection with a request received in step 1802 where the requested read data is not in cache (e.g., read miss or cache miss). For example, the request may be a read I/O request received at the data storage system from a client, such as a host. Alternatively, the read request may be in connection with other operations or tasks. From step 1802, control proceeds to 1804 where a the data block is read from physical storage. From step 1804, control proceeds to step 1806 where a determination is made as to whether the data block retrieved from storage was previously deduplicated. If step 1806 evaluates to yes, control proceeds to step 1808 to reconstruct or compose any previously deduplicated sub-block of the data block. From step 1808, control proceeds to step 1810. If step 1806 evaluates to no, control proceeds to step 1810.

At step 1810, a determination is made as to whether any portion (e.g., sub-block) of the data block has been stored in its compressed form. If step 1810 evaluates to yes, control proceeds to step 1812 to decompress any compressed sub-blocks of the data block. From step 1812, control proceeds to step 1814. If step 1810 evaluates to yes, control proceeds to step 1814. At step 1814, a determination is made as to whether the requested data block has a tag located therein. If step 1814 evaluates to yes, control proceeds to step 1816 to overwrite the tag at tag location or offsets identified in the tag descriptor. From step 1816, control proceeds to step 1820. If step 1814 evaluates to no, control proceeds to step 1820. At step 1820, the requested read data block may be returned to the client or requester.

When performing read operations such as in connection with FIG. 18 processing, an embodiment in accordance with techniques herein may perform operations with respect to a single buffer, as opposed to using multiple buffers requiring subsequent memory copying and buffer merging. For example, assume the read is for a data block that was previously deduplicated at the block level (e.g. is a duplicate of a target block stored in compressed form). The entire 4K target data block may be uncompressed where the uncompressed form of the block is stored directly in the buffer. Subsequently, the tag stored as part of the block metadata may be read and then written directly to its specified location (e.g., per tag descriptor) in the buffer. The buffer may be an I/O buffer that is then returned to the client/requester. As another example, consider a tagged data block that includes both deduped and non-deduped portions that are compressed. As a first step, processing may uncompress the compressed deduped target directly into the I/O buffer at a desired offset in the buffer. As a second step, processing may uncompress the compressed non-deduped portion and store it directly in the I/O buffer at a desired offset in the buffer. As a third step, the buffer may be overwrite with the tag at the specified tag location (as denoted in the location field of the tag descriptor). The buffer may be an I/O buffer that is then returned to the client/requester.

What will now be described is another improvement or optimization that may be performed. Reference is made back to the dedupe DB 150 of FIG. 1. In at least one embodiment, the dedupe DB 150 stored in memory, such as cache, may be only a subset or portion of the actual total number of entries of the on-disk dedupe DB as stored persistently on non-volatile physical storage. In at least one embodiment, deduplication processing may be performed using only the portion of the dedupe DB currently in memory or cache without retrieving other portions of the dedupe DB from non-volatile storage. In other words, if a look up for a digest of a sub-block is performed and there is no matching entry in the cached portion of the dedupe DB 150, in such an embodiment there is no further lookup in the on-disk dedupe DB and processing determines that there is no entry in the dedupe DB for digest (e.g., sub-block is unique and not a duplicate). In such an embodiment using only the cached portion of the dedupe DB 150, requirements regarding the computed digest size may be relaxed. As processing only performs look-ups in connection with deduplication processing in the cached dedupe DB 150, a reduced smaller size of a digest key may be used. The reduced size of the key used for the cached dedupe DB 150 may be sufficient to keep digest collision probability sufficiently low in the context of the characteristics of cached dedupe DB 150. For example, the size of the cached dedupe DB 150 may a maximum of 1 TB (terabyte), as opposed, for example, to a 2 petabyte sized version of the complete on-disk dedupe DB.

As another reason why smaller digest or hash key sizes may be used, an embodiment in accordance with techniques herein may always perform a byte by byte actual data comparison of candidate and target sub-blocks subsequent to determining matching digests of such sub-blocks. In connection with identifying duplicate sub-blocks such as in connection with ILD processing, there may be hash or digest collisions where 2 data blocks have the same digest or hash. In an embodiment using larger and stronger hash values such as a cryptographic hash, the possibility of a hash or digest collision may be very low or negligible but may still occur. In an embodiment not a smaller weaker hash such as using a non-cryptographic hashing technique, the possibility of a hash or digest collision may increase in comparison to an embodiment using a cryptographic hash. In at least one embodiment in accordance with techniques herein, processing to determine whether two sub-blocks are identical may include first determining that both sub-blocks have the same digest or hash. Additionally, an embodiment may further ensure that both sub-blocks are identical or matching (e.g., not a digest or hash collision) by subsequently comparing the data content of the two sub-blocks (e.g., byte by byte comparison) having the matching digests to ensure that the actual data content of the 2 sub-blocks is also identical. As a result, having a higher probability of hash collision is acceptable. Thus, an embodiment in accordance with techniques herein may use a smaller, reduced size hash or digest determined in accordance with the maximum possible size of the cached dedupe DB 150. Additionally, a non-cryptographic hash function may be used, as opposed to a cryptographic hash, which utilizes less time and computation to obtain desired digests. This is desirable, for example, in embodiments performing inline processing in efforts to reduce or minimize I/O response time and latency.

In at least one embodiment in accordance with techniques herein, a smaller and weaker hash, such as a non-cryptographic hash, may be used in connection with the cached dedupe DB 150 in comparison to acceptable hash or digest requirements used with the larger on-disk complete dedupe DB. The probability P of a hash collision may be determined in accordance with N, the number of entries or size of the cached dedupe DB 150 (e.g., 1 TB); and M, the number of possible hash values or digests (as based on the length or number of bits in the hash or digest computed). More formally, the probability P of a hash collision is proportional to $2M/N^2$. In at least one embodiment for a 512 byte sector or sub-block, the size of the digest may be 4 bytes or 6 bytes with a maximum size of 1 TB for the cached dedupe DB 150.

In at least one embodiment, a smaller or reduced size digest may be utilized for keys of the cached dedupe DB 150 such as a specified number of bits of an original digest generated by a hash algorithm, such as Murmer-3. The reduced digests may be used as the key values to index into the hash table of the data store. In this case, the probability of 2 different data blocks generating the same reduced digest increases in comparison to embodiments using the full complete digests as keys of the hash table of the data store.

In at least one embodiment in accordance with techniques herein, a non-cryptographic hash function, such as a MurmurHash non-cryptographic hash function, may be used. MurmurHash is a non-cryptographic hash function known in the art that is suitable for general hash-based lookup. Unlike cryptographic hash functions, non-cryptographic hash functions such as MurmurHash are not specifically designed to be difficult to reverse, making it generally unsuitable for cryptographic purposes but useful and suitable for other purposes such as data deduplication as described herein. MurmurHash has several variants which are in the public domain. In particular, one variant, sometimes referred to or known as MurmurHash2, generates a 160-bit or 20 byte hash. Thus, such an algorithm or hash function based on MurmurHash2 may be used to generate the 20 byte hash value for a sub-block. Since the MurmurHash hash algorithm generates a 20 byte output, a truncated or reduced portion of the 20 byte output may be used as the digest or hash value for the sub-block. In an embodiment in which the sub-block digests are also used to index into an much larger and complete dedupe DB as stored on-disk, the original full digest prior to truncation may be used. In this manner, for a sub-block having a corresponding digest generated by the hashing algorithm, the sub-block's full or complete digest (e.g., 20 bytes) may be used as the key to index into the larger on-disk version of the dedupe DB and the truncated reduced digest (e.g., 4 or 6 bytes of the 20 byte digest) may be used as the key to index into the smaller cached portion of the dedupe DB 150.

In at least one embodiment as mentioned above, only the in memory or in cache portion of the dedupe DB 150 may be used in connection with inline processing such as ILD. If deduplication as described herein is performed offline or not part of the I/O path or data path, both the in-memory/cached portion of the dedupe DB 150 may be used in combination with the larger on-disk version of the dedupe DB. If there is a miss or fault with respect to performing a lookup in the cached portion of the dedupe DB 150 using the truncated digest, the on-disk version of the dedupe DB may be consulted using the complete untruncated digest.

In at least one embodiment in accordance with techniques herein, processing may be performed when searching the dedupe DB 150 that results in identifying multiple target blocks that match, partially or completely, a candidate block. In such a case, a heuristic may be utilized for evaluating and selecting which of the multiple matching target blocks is deemed a better match and selected as the target block to use for deduplication with respect to the candidate block. For example, let ABCDEFGH represent the content of a candidate block, where each letter represents a 512 sub-block or sector. Also assume there are 2 target blocks in the dedupe DB 150: first target block BBBBBBBH and second target block ABCDEFJH, where each letter represents a 512 sub-block or sector. In connection with processing as described herein, a first partial match between the candidate and the first target block may be determined wherein only the last sub-block 7 of both the candidate and target block containing "H" match (1 sub-block matches). A second partial match between the candidate and the second target block may be determined where all but the second to last sub-block 6 of both blocks match (e.g., 7/8 sub-blocks match). In this case, an embodiment may choose to perform data deduplication of the candidate block with respect to the target block having a higher/highest number of matching sub-blocks. In connection with the foregoing example, processing may select the second target block for use in connection with de-duplicating the candidate block.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of processing data comprising:
   receiving a candidate block including a plurality of uniformly-sized sub-blocks, wherein a tag is stored at a first location in the candidate block;
   performing data deduplication processing of the candidate block, wherein the data deduplication processing excludes content stored at the first location, and wherein a first offset to a second offset of the candidate block corresponds to the first location, wherein a tag descriptor includes tag content and includes location information identifying the first location in the candidate block, and wherein the tag content is stored at the first location in the candidate block;
   determining whether at least one sub-block of the candidate block has been deduplicated by the data deduplication processing; and
   responsive to determining that at least one sub-block of the candidate block has been deduplicated, storing the candidate block as a deduplicated data block having at least one sub-block matching an existing target sub-block, wherein the tag descriptor describing the tag is stored and associated with the candidate block.

2. The method of claim 1, wherein the tag descriptor is included in block-level metadata of the candidate block.

3. The method of claim 1, wherein the tag has a corresponding size that is less than a size of one of the plurality of sub-blocks of the candidate block.

4. The method of claim 1, wherein the tag is a logically contiguous region located at the first location in the candidate block.

5. The method of claim 4, wherein the logically contiguous region spans two logically adjacent sub-blocks of the candidate block.

6. The method of claim 1, wherein the location information of the tag descriptor includes a starting offset identifying a starting location in the candidate block where the tag is stored, and a length denoting a length of the tag.

7. The method of claim 1, further comprising:
receiving a request to read a first block, wherein at least a first sub-block of the first block has been deduplicated whereby the first sub-block is a duplicate of a first target sub-block, and wherein at least a second sub-block of the first block has not been deduplicated;
performing first processing to construct the first block comprising:
storing the first target sub-block and the second sub-block in a buffer; and
overwriting specified locations in the buffer with a second tag having an associated second tag descriptor stored in metadata of the first block; and
returning the buffer to a client that requested the first block.

8. The method of claim 7, wherein the first processing includes decompressing the first target sub-block and the second sub-block and storing corresponding decompressed forms of the first target sub-block and the second sub-block in the buffer.

9. The method of claim 1, wherein the method is performed inline as part of the I/O or data path, and the candidate block is written in connection with a write I/O operation.

10. The method of claim 1, wherein said data deduplication processing includes:
searching a deduplication database for a target sub-block that matches a first sub-block of the candidate block;
responsive to finding a matching entry in the deduplication database for the target sub-block matching the first sub-block of the candidate block, performing first processing including:
identifying a portion of a previously stored target block that corresponds to the target sub-block;
identifying a target range of the target block that matches a duplicate range of the first sub-block of the candidate block; and
configuring mapping metadata of the candidate block to reference the target range of the target block as corresponding to deduplicated data stored at the duplicate range of the first sub-block of the candidate block.

11. The method of claim 10, wherein the deduplication database is stored in cache is a first deduplication database, and wherein the first deduplication database stored in cache includes a portion of entries of a second larger deduplication database that is stored on non-volatile storage.

12. The method of claim 11, wherein the first deduplication database stored in cache is indexed using keys of a first size and the second larger deduplication database stored on non-volatile storage is indexed using keys of a second size larger than the first size.

13. The method of claim 12, wherein the second larger deduplication database uses keys of the second size generated using a hash function and wherein keys of the first deduplication database are truncated hash values generated using the hash function.

14. The method of claim 1, wherein the tag is a difference or delta region identified in the candidate block that, except for the tag, is identical to an existing target block stored in a deduplication database.

15. A method of processing data comprising:
receiving a candidate block including a plurality of uniformly-sized sub-blocks, wherein a tag is stored at a first location in the candidate block;
performing data deduplication processing of the candidate block, wherein the data deduplication processing excludes content stored at the first location, and wherein a first offset to a second offset of the candidate block corresponds to the first location;
determining whether at least one sub-block of the candidate block has been deduplicated by the data deduplication processing; and
responsive to determining that at least one sub-block of the candidate block has been deduplicated, storing the candidate block as a deduplicated data block having at least one sub-block matching an existing target sub-block, wherein a tag descriptor describing the tag is stored and associated with the candidate block, and wherein the method includes performing first processing that determines whether the candidate block has the tag, said first processing including:
scanning the candidate block from a right-most sub-block and determining the second offset at which a difference is detected between the candidate block and a target block;
scanning the candidate block from a left-most sub-block and determining the first offset at which a difference is detected between the candidate block and the target block;
determining whether a distance between the first offset and the second offset is less than a maximum tag size; and
responsive to determining the distance is less than the maximum tag size, determining that the candidate block has the tag with an associated tag location from the first offset to the second offset in the candidate block.

16. The method of claim 15, wherein the first processing determines that the candidate block, excluding content located from the first offset to the second offset, is a duplicate of the target block.

17. A system comprising:
at least one processor; and
a memory comprising code stored thereon that, when executed, performs a method of processing data comprising:
receiving a candidate block including a plurality of uniformly-sized sub-blocks, wherein a tag is stored at a first location in the candidate block;
performing data deduplication processing of the candidate block, wherein the data deduplication processing excludes content stored at the first location, and wherein a first offset to a second offset of the candidate block corresponds to the first location, wherein a tag descriptor includes tag content and includes location information identifying the first location in the candidate block, and wherein the tag content is stored at the first location in the candidate block;

determining whether at least one sub-block of the candidate block has been deduplicated by the data deduplication processing; and responsive to determining that at least one sub-block of the candidate block has been deduplicated, storing the candidate block as a deduplicated data block having at least one sub-block matching an existing target sub-block, wherein the tag descriptor describing the tag is stored and associated with the candidate block.

18. A non-transitory computer readable medium comprising code stored thereon that, when executed, performs a method of processing data comprising:

receiving a candidate block including a plurality of uniformly-sized sub-blocks, wherein a tag is stored at a first location in the candidate block;

performing data deduplication processing of the candidate block, wherein the data deduplication processing excludes content stored at the first location, and wherein a first offset to a second offset of the candidate block corresponds to the first location, wherein a tag descriptor includes tag content and includes location information identifying the first location in the candidate block, and wherein the tag content is stored at the first location in the candidate block;

determining whether at least one sub-block of the candidate block has been deduplicated by the data deduplication processing; and responsive to determining that at least one sub-block of the candidate block has been deduplicated, storing the candidate block as a deduplicated data block having at least one sub-block matching an existing target sub-block, wherein the tag descriptor describing the tag is stored and associated with the candidate block.

19. The non-transitory computer readable medium of claim 18, wherein the tag descriptor is included in block-level metadata of the candidate block.

20. A system comprising:

at least one processor; and a memory comprising code stored thereon that, when executed, performs a method of processing data comprising:

receiving a candidate block including a plurality of uniformly-sized sub-blocks, wherein a tag is stored at a first location in the candidate block;

performing data deduplication processing of the candidate block, wherein the data deduplication processing excludes content stored at the first location, and wherein a first offset to a second offset of the candidate block corresponds to the first location;

determining whether at least one sub-block of the candidate block has been deduplicated by the data deduplication processing; and responsive to determining that at least one sub-block of the candidate block has been deduplicated, storing the candidate block as a deduplicated data block having at least one sub-block matching an existing target sub-block, wherein a tag descriptor describing the tag is stored and associated with the candidate block, and wherein the method includes performing first processing that determines whether the candidate block has the tag, said first processing including:

scanning the candidate block from a right-most sub-block and determining the second offset at which a difference is detected between the candidate block and a target block;

scanning the candidate block from a left-most sub-block and determining the first offset at which a difference is detected between the candidate block and the target block;

determining whether a distance between the first offset and the second offset is less than a maximum tag size; and responsive to determining the distance is less than the maximum tag size, determining that the candidate block has the tag with an associated tag location from the first offset to the second offset in the candidate block.

21. A non-transitory computer readable medium comprising code stored thereon that, when executed, performs a method of processing data comprising:

receiving a candidate block including a plurality of uniformly-sized sub-blocks, wherein a tag is stored at a first location in the candidate block;

performing data deduplication processing of the candidate block, wherein the data deduplication processing excludes content stored at the first location, and wherein a first offset to a second offset of the candidate block corresponds to the first location;

determining whether at least one sub-block of the candidate block has been deduplicated by the data deduplication processing; and responsive to determining that at least one sub-block of the candidate block has been deduplicated, storing the candidate block as a deduplicated data block having at least one sub-block matching an existing target sub-block, wherein a tag descriptor describing the tag is stored and associated with the candidate block, and wherein the method includes performing first processing that determines whether the candidate block has the tag, said first processing including:

scanning the candidate block from a right-most sub-block and determining the second offset at which a difference is detected between the candidate block and a target block;

scanning the candidate block from a left-most sub-block and determining the first offset at which a difference is detected between the candidate block and the target block;

determining whether a distance between the first offset and the second offset is less than a maximum tag size; and responsive to determining the distance is less than the maximum tag size, determining that the candidate block has the tag with an associated tag location from the first offset to the second offset in the candidate block.

* * * * *